(12) United States Patent
Danby et al.

(10) Patent No.: US 6,554,023 B2
(45) Date of Patent: Apr. 29, 2003

(54) VACUUM DEMAND FLOW VALVE

(75) Inventors: Hal C. Danby, Sudbury (GB); Mark E. Williamson, Wonder Lake, IL (US)

(73) Assignee: Baxter International Inc., Deerfield, IL (US)

( * ) Notice: Subject to any disclaimer, the term of this patent is extended or adjusted under 35 U.S.C. 154(b) by 0 days.

(21) Appl. No.: 09/880,721

(22) Filed: Jun. 13, 2001

(65) Prior Publication Data
US 2002/0189683 A1 Dec. 19, 2002

(51) Int. Cl.[7] .............................................. F16K 31/126
(52) U.S. Cl. ........................................ 137/510; 137/907
(58) Field of Search ................... 137/494, 495, 137/509, 510 I, 907, 908; 220/705, 715

(56) References Cited

U.S. PATENT DOCUMENTS

| | | | |
|---|---|---|---|
| 274,447 A | 3/1883 | Kennish | |
| 1,893,401 A | 1/1933 | De Jesus-Angeles | |
| 2,555,490 A | 6/1951 | Horn | |
| 2,893,381 A | 7/1959 | Black | |
| 3,608,574 A | 9/1971 | Beaussant | |
| 3,746,036 A | * 7/1973 | Du Bois et al. | ............ 137/510 |
| 3,752,366 A | 8/1973 | Lawrence, Jr. | |
| 3,754,690 A | 8/1973 | Marchant | |
| 4,071,025 A | 1/1978 | Kohnke | |
| 4,102,476 A | 7/1978 | Loeffler | |
| 4,135,513 A | 1/1979 | Arisland | |
| 4,167,184 A | 9/1979 | Köhnke | |
| 4,356,823 A | 11/1982 | Jackson | |
| 4,420,097 A | 12/1983 | Motsenbocker | |
| 4,483,465 A | 11/1984 | Lawrence | |
| 4,534,542 A | 8/1985 | Russo | |
| 4,693,400 A | 9/1987 | Frahm et al. | |
| 4,941,598 A | 7/1990 | Lambelet, Jr. et al. | |
| 5,050,758 A | 9/1991 | Freeman et al. | |
| 5,076,322 A | 12/1991 | Choksi et al. | |
| 5,197,638 A | 3/1993 | Wood | |
| 5,241,985 A | 9/1993 | Faust et al. | |
| 5,245,991 A | 9/1993 | Kawaguchi | |
| 5,409,035 A | * 4/1995 | Scott et al. | .................. 137/510 |
| 5,472,123 A | 12/1995 | Jangaard | |
| 5,607,073 A | 3/1997 | Forrer | |
| 5,653,251 A | 8/1997 | Handler | |
| 5,732,737 A | 3/1998 | Condon | |
| 5,826,621 A | 10/1998 | Jemmott | |
| 5,850,908 A | * 12/1998 | Jasek | .................... 220/203.23 |
| 6,032,831 A | 3/2000 | Gardner et al. | |
| 6,050,444 A | 4/2000 | Sugg | |
| 6,070,767 A | 6/2000 | Gardner et al. | |
| 6,145,695 A | * 11/2000 | Garrigues | .................... 220/705 |
| 6,145,707 A | 11/2000 | Baudin | |
| 6,247,619 B1 | 6/2001 | Gill et al. | |
| 6,264,166 B1 | 7/2001 | Bowland et al. | |
| 6,290,090 B1 | 9/2001 | Essebaggers | |
| 6,305,570 B1 | 10/2001 | Atkin et al. | |
| 6,364,168 B1 | 4/2002 | Gardner et al. | |

FOREIGN PATENT DOCUMENTS

| | | |
|---|---|---|
| AU | B-77302/87 | 2/1988 |
| AU | B-83126/87 | 7/1988 |
| AU | B-46621/89 | 6/1990 |
| AU | B-57350/90 | 1/1991 |
| AU | B-35525/93 | 5/1993 |
| AU | B-32520/93 | 7/1993 |
| AU | B-23138/92 | 9/1993 |

(List continued on next page.)

Primary Examiner—Stephen M. Hepperle
(74) Attorney, Agent, or Firm—Francis C. Kowalik; Paul J. Nykaza

(57) ABSTRACT

A valve is disclosed for dispensing a flowable material. The valve has a first chamber (40) at a first pressure wherein said first chamber (40) defines an outlet (28) in communication with said first chamber (40). A second chamber (42) is at a second pressure. The valve has a stop (18) indexed against a third pressure, operating to selectively place the first chamber (40) into communication with the second chamber (42). The stop (18) is operative to connect the second chamber (42) to said first chamber (40) when the first pressure is less than the third pressure.

22 Claims, 18 Drawing Sheets

FOREIGN PATENT DOCUMENTS

| | | |
|---|---|---|
| AU | A-59472/94 | 6/1994 |
| AU | B-60636/96 | 9/1996 |
| AU | B-56228/96 | 1/1997 |
| AU | 730578 | 11/1997 |
| CH | 528 098 | 11/1976 |
| DE | 87 01 155.7 | 5/1987 |
| EP | 0 835 149 B1 | 5/2000 |
| FR | 1024522 | 4/1953 |
| FR | 1145605 | 10/1957 |
| FR | 2664812 | 1/1992 |
| JP | 55-107690 | 8/1980 |
| WO | WO 88/02339 | 4/1988 |
| WO | WO 91/06335 | 5/1991 |
| WO | WO 93/16928 | 9/1993 |
| WO | WO 94/06514 | 3/1994 |
| WO | WO 94/12222 | 6/1994 |
| WO | WO 95/23742 | 9/1995 |
| WO | WO 96/19253 | 6/1996 |
| WO | WO 97/27119 | 7/1997 |
| WO | WO 99/12597 | 3/1999 |
| WO | WO 99/38423 A1 | 8/1999 |
| WO | WO 99/62787 | 12/1999 |
| WO | WO 00/01435 | 1/2000 |
| WO | WO 00/37327 | 6/2000 |
| WO | WO 00/53248 | 9/2000 |
| WO | WO 01/00263 | 1/2001 |
| WO | WO 01/92133 A3 | 12/2001 |
| WO | WO 01/92133 A2 | 12/2001 |

\* cited by examiner

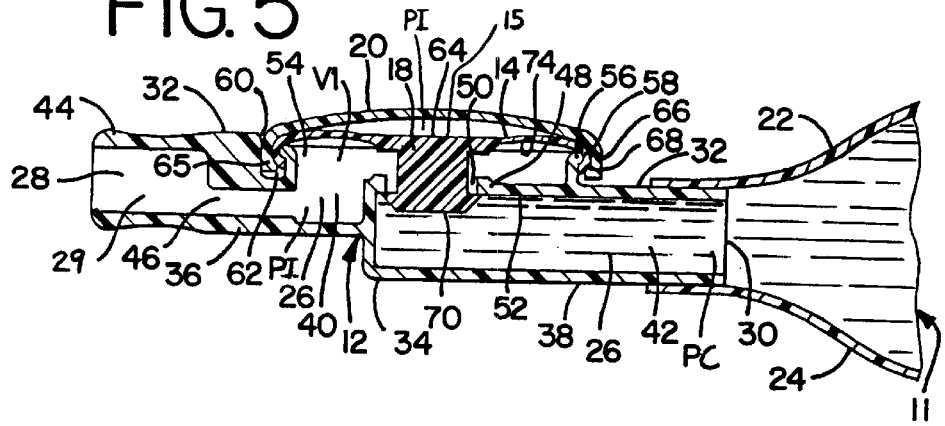
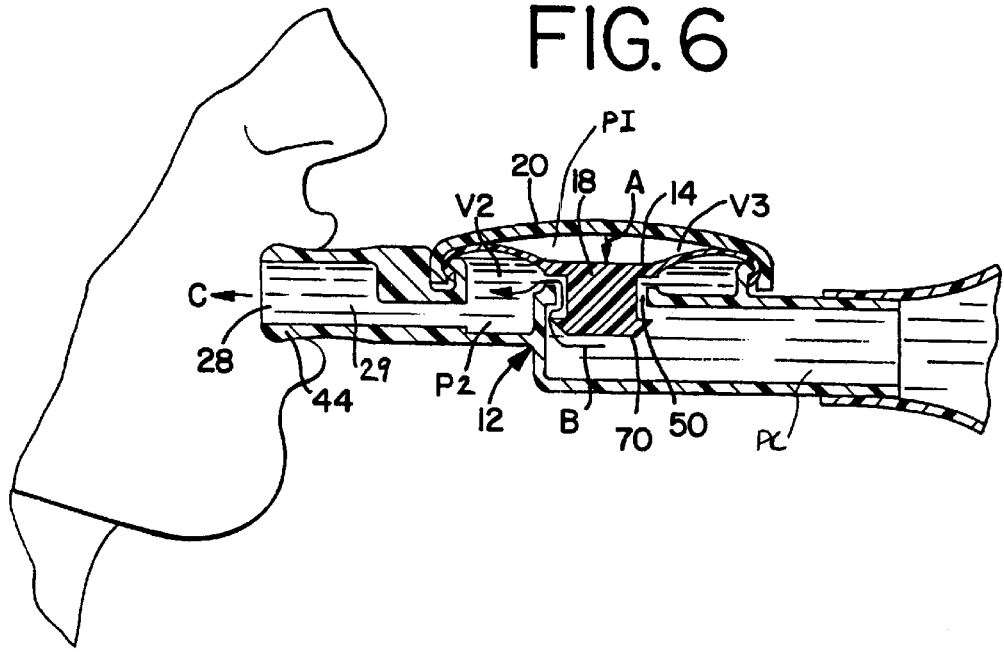
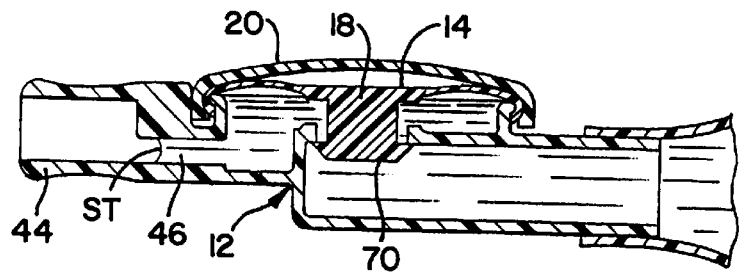

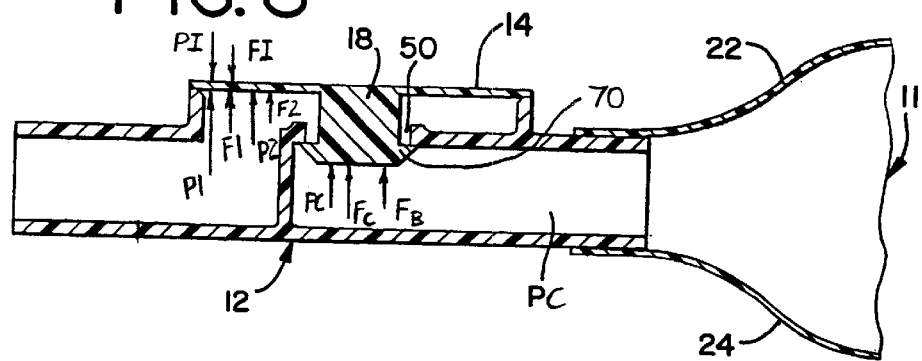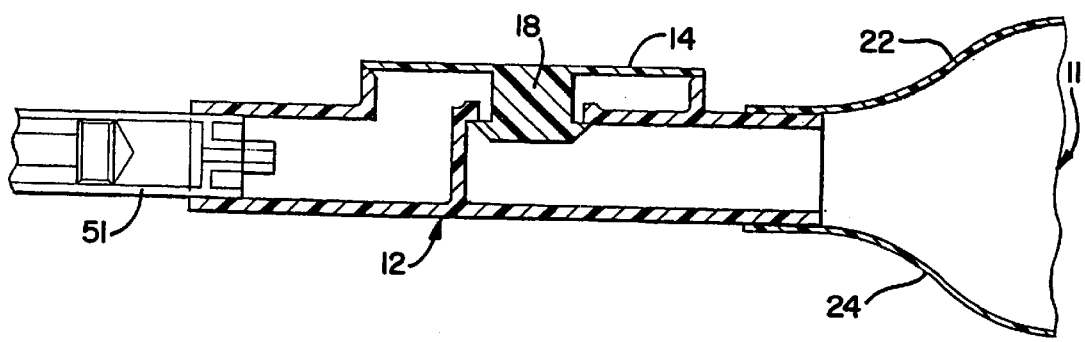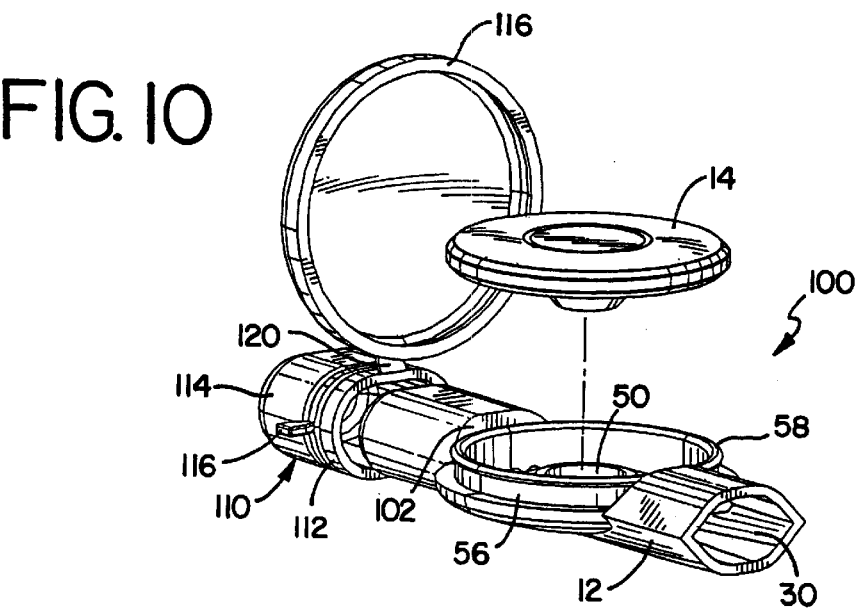

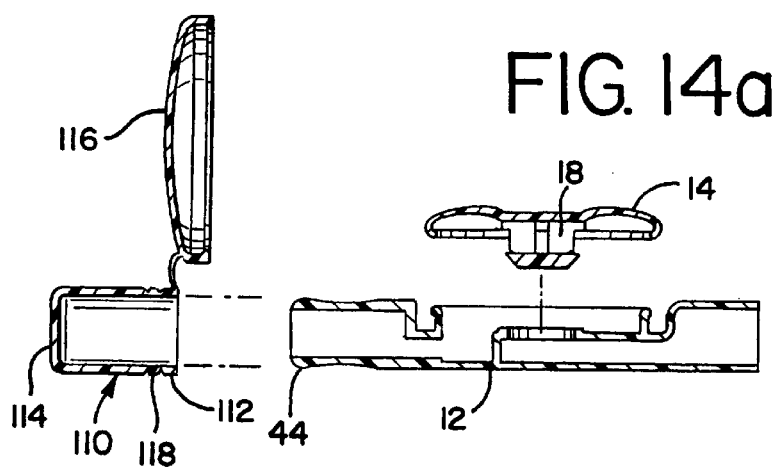
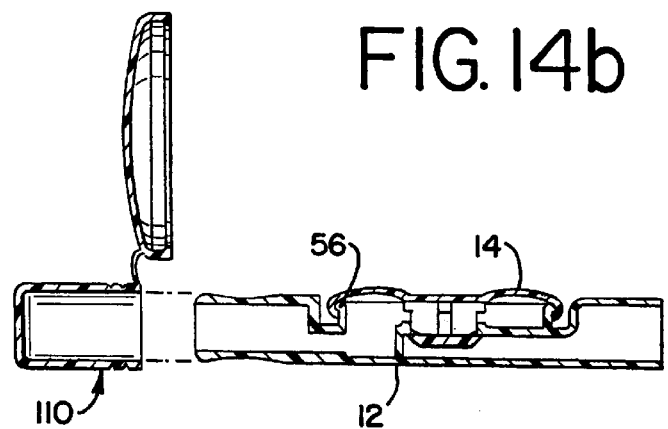
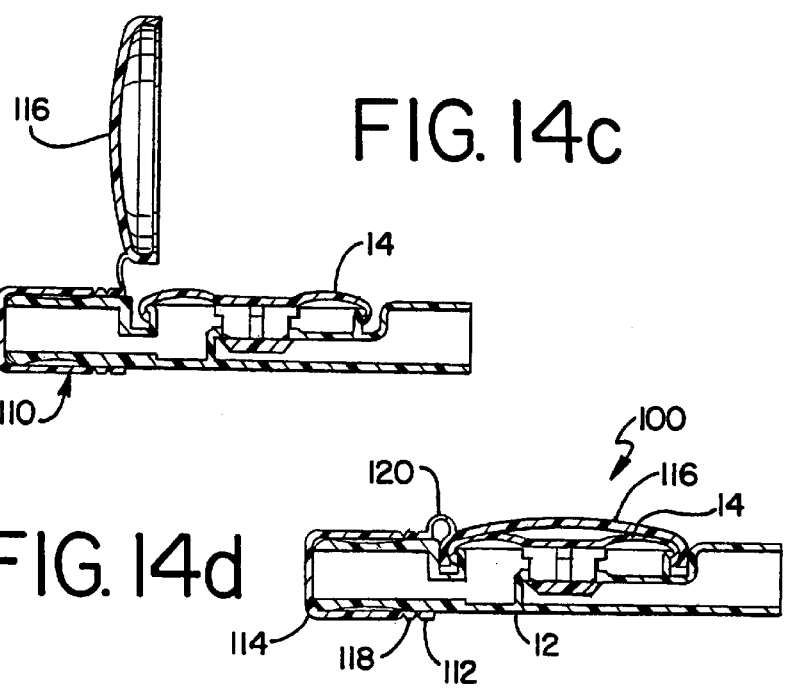

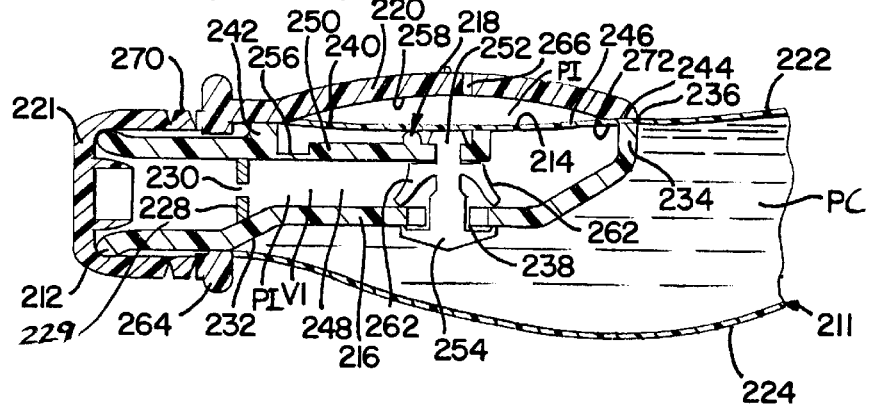

FIG. 29a
FIG. 29b
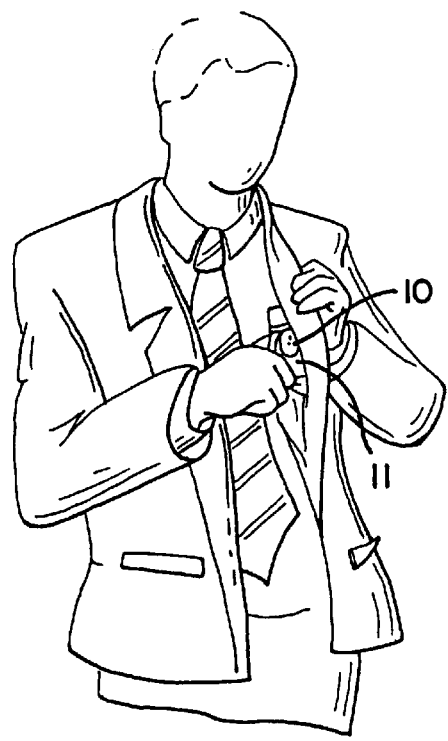
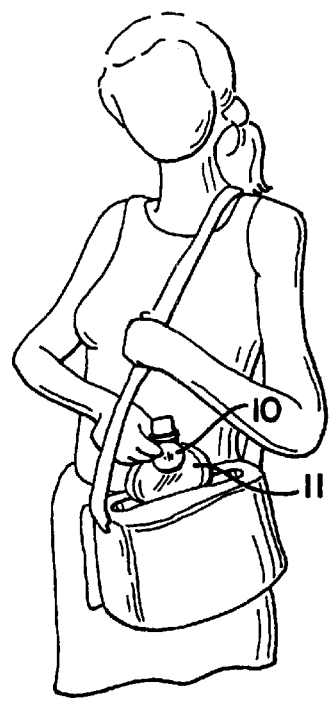
FIG. 29c
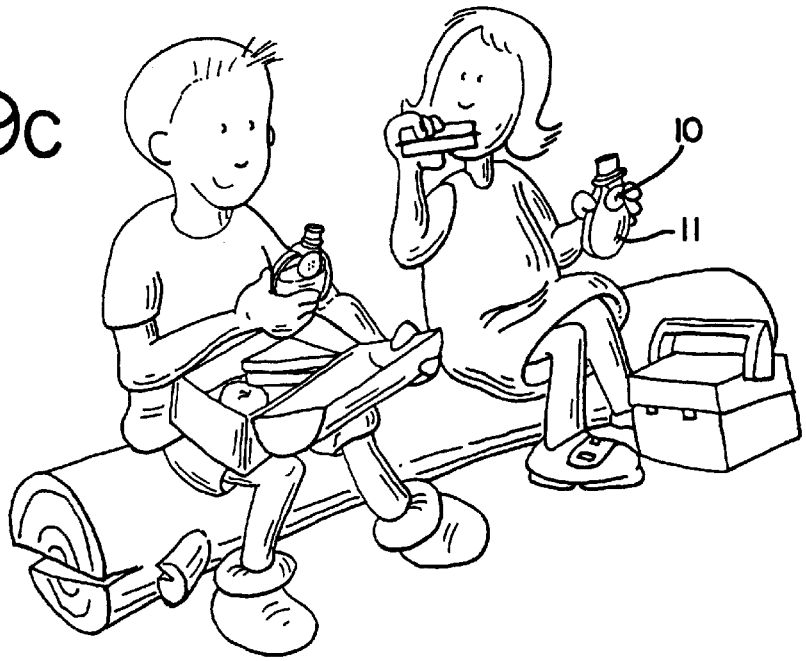

FIG. 34a
FIG. 34b
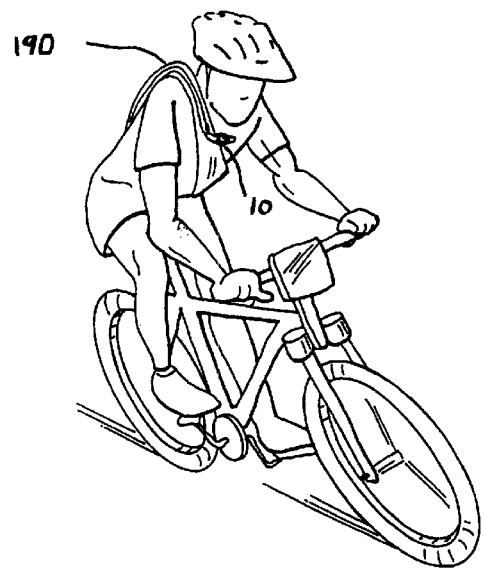
FIG. 34c
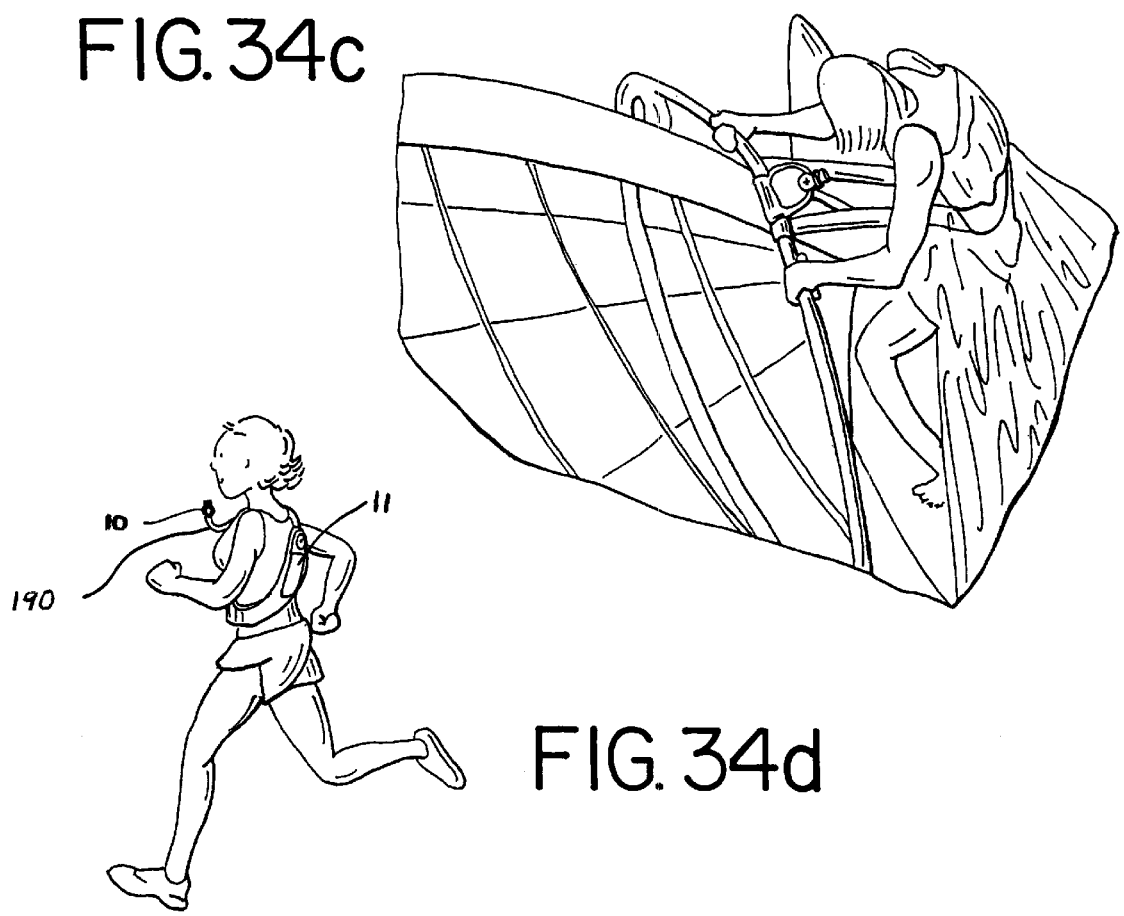
FIG. 34d

VACUUM DEMAND FLOW VALVE

DESCRIPTION

1. Technical Field

The present invention relates generally to valves used in conjunction with fluid containers or tubing, and more specifically to a valve associated with a fluid container and being actuated by a vacuum.

2. Background Prior Art

Fluid containers are widely used throughout the world and come in many forms. Such fluid containers are made from a variety of materials and are used for numerous purposes. For example, containers are commonly used to contain fluids such as water, soft drinks, sports drinks, alcoholic beverages and the like for individual consumer use and consumption. Fluid containers are also widely used in other applications such as in a medical setting. For example, fluid containers are used in hospitals to provide nutritional fluids to patients who cannot eat solid food. Also fluid containers contain a variety of material used in industry and various mechanical arts such as engines and the like.

A drawback to using such containers is the contents of the container can be easily spilled and, therefore, wasted. Not only are the contents lost but fluid spills can damage the surface the fluid contacts. Spilling of fluid contents is a particularly common occurrence for patients in a hospital setting. The patients can be under sedation or other medication that causes drowsiness or disorientation. The patients can also often drift into an involuntary unconscious state while consuming the nutritional products. This can result in spillage of the nutritional product over the patients' bedding requiring changing of the bedding and cleaning of the spillage. FIG. 1 shows a variety of settings where fluid spills can occur. For example, fluids contained in drink pouches or drink boxes popular with children can be spilled through the straw supplied with the containers. Additionally, one is familiar with the problems arising with fluid spills in an industrial setting, wherein the spill of a caustic or dangerous chemical causes significant clean-up expense as well as placing workers in a potentially hazardous position.

Some fluid containers may be supplied with a closure such as a threaded cap. Such closures, however, normally must be open and/or closed manually by hand. This makes it difficult for consumers to use during certain activities such as running or cycling, or if consumers are carrying several other items that cannot be put down. Other closures have been developed that can be automatically actuated but are difficult to use. Such containers are also not economical to manufacture to be used with disposable fluid containers.

The present invention is provided to solve these and other problems.

SUMMARY OF THE INVENTION

The present invention provides a vacuum demand flow valve capable of dispensing a flowable material. In one preferred embodiment, the vacuum demand flow valve is attached to a drink container.

According to one aspect of the invention, a vacuum demand flow valve has a member subject to a first force operative to keep the valve closed. The member is sensitive to an index pressure. The valve has an outlet at a second pressure, the index pressure provides a second force in opposition to said first force when a differential between the second pressure and the index pressure is provided to open the valve when the second pressure is sufficiently less than the index pressure to overcome the first force.

According to another aspect of the invention, the valve provides a flowable material delivery device. The device has a first chamber at a first pressure wherein the first chamber defines an outlet in communication with said first chamber. The device has a second chamber at a second pressure at least substantially equal to the first pressure. The device has a valve member, indexed against a third pressure, operating to selectively place the first chamber into communication with the second chamber. The stop is operative to connect the second chamber to said first chamber when the first pressure is less than the third pressure.

According to another aspect of the invention, a vacuum demand flow valve has a housing defining a passageway for a flowable material to pass therethrough. The passageway has a first volume when in a first position wherein the flowable material is not allowed to pass through the passageway. The passageway has a second volume less than the first volume when in a second position wherein the flowable material is allowed to pass through the passageway. The passageway is moveable from the first position to the second position by a vacuum applied through the passageway, wherein the difference between the volumes associates with the first position and the second position providing for the flowable material to retreat from the outlet of the valve and therefore be retained in the passageway.

According to another aspect of the invention, the housing has a port member defining an external opening in communication with the passageway. The port member is adapted to be covered by a mouth of a user to apply the vacuum through the passageway. When the vacuum is applied, a force is applied to the housing in a first direction in response to the vacuum thereby placing the passageway in the second position, wherein flowable material flows through the passageway in a second direction. The vacuum can also be applied by a syringe or a pump in communication with the passageway.

According to another aspect of the invention, a volume transition in the passageway between the second position and the first position causes flowable material to retreat into the passageway. An outlet is in communication with the passageway wherein the volume transition causes the flowable material to retreat from the outlet.

According to another aspect of the invention, the port member has an orifice. The orifice is sized such that surface tension associated with the flowable substance across the orifice prevents the flowable material located within the passageway from passing through the orifice when the vacuum is removed from the passageway. The port member can also have a venturi structure defining the external opening.

According to a further aspect of the invention, a valve has a port member defining an outer opening. The valve has a base member extending from the port member wherein the base member has an inner opening. A diaphragm extends between and is connected to the port member and the base member wherein a passageway is defined between the base member and diaphragm. The passageway is in communication with the outer opening and the inner opening. A stop member is connected to the diaphragm and has a plug that obscures the inner opening. The diaphragm is flexible from a first position wherein the passageway has a first volume and a second position wherein the passageway has a second volume. The plug is displaced from the inner opening in response to the movement of the diaphragm to the second position wherein a flowable substance can pass through the inner opening and passageway and outer opening.

According to a further aspect of the invention, the valve is connected to a container having at least one flexible sidewall, a portion of the flexible sidewall comprises the diaphragm. An end of the base member is connected to an underside surface of the flexible sidewall.

According to yet another aspect of the invention, a diaphragm is provided which is flexible so as to be responsive to a vacuum applied through the passageway. The diaphragm can also be flexible in response to an external force applied to the diaphragm to deflect the diaphragm.

According to another aspect of the invention, the housing has a port member defining an external opening in communication with the passageway wherein the port member is adapted to be covered by a user's mouth to apply the vacuum.

According to another aspect of the invention, the vacuum demand flow valve is attached in an opening of a fluid container.

According to yet another aspect of the invention, a method of delivering a flowable material is disclosed. A first chamber is provided defining an outlet. A second chamber is provided that acts as a fluid reservoir. A valve index pressure is also provided. An opening is provided connecting the first chamber and the second chamber, and a valve is positioned in the opening. A first pressure is applied to the first chamber, the first pressure being less than the index pressure, wherein the valve moves from a closed position to an open position wherein flowable material flows through the outlet.

According to a further aspect of the invention, a method of delivering a flowable material provides a housing defining a passageway for the flowable material to pass therethrough. The passageway has a first volume when in a first position wherein the flowable material is not allowed to pass through the passageway. The passageway has a second volume less than the first volume when in a second position wherein the flowable material is allowed to pass through the passageway. A vacuum is applied through the passageway wherein the passageway is moveable from the first position to the second position wherein the return of the passageway from the second position to the first position serves to retain the flowable material within the passageway by causing the flowable material to retreat up the passageway.

Other features and advantages of the invention will be apparent from the following specification taken in conjunction with the following drawings.

BRIEF DESCRIPTION OF THE DRAWINGS

FIG. 5 is a partial cross-sectional view of the valve and container, the valve being shown in a closed position;

FIG. 6 is a partial cross-sectional view of the valve and container, the valve being placed in an open position by a user;

FIG. 7 is a partial cross-sectional view of the valve and container, the valve returned to a closed position;

FIG. 8 is a schematic view of the valve of the present invention; and

FIG. 9 is a partial cross-sectional view of the valve and container, the valve adapted to be placed in an open position via a syringe;

FIG. 10 is an exploded perspective view of another embodiment of the vacuum demand flow valve of the present invention;

FIGS. 14a–d are cross-sectional views showing assembly of the valve of FIG. 10;

FIG. 24 is a partial cross-sectional view of the valve and container of FIG. 21, the valve being shown in a closed position;

FIG. 25 is a partial cross-sectional view of the valve and container of FIG. 21, the valve being placed in an open position by a user;

FIGS. 29a–c are schematic views showing various uses of the vacuum demand flow valve of the present invention;

FIGS. 34a–d are schematic views showing additional uses of the vacuum demand flow valve of the present invention;

DETAILED DESCRIPTION

Figure 1:
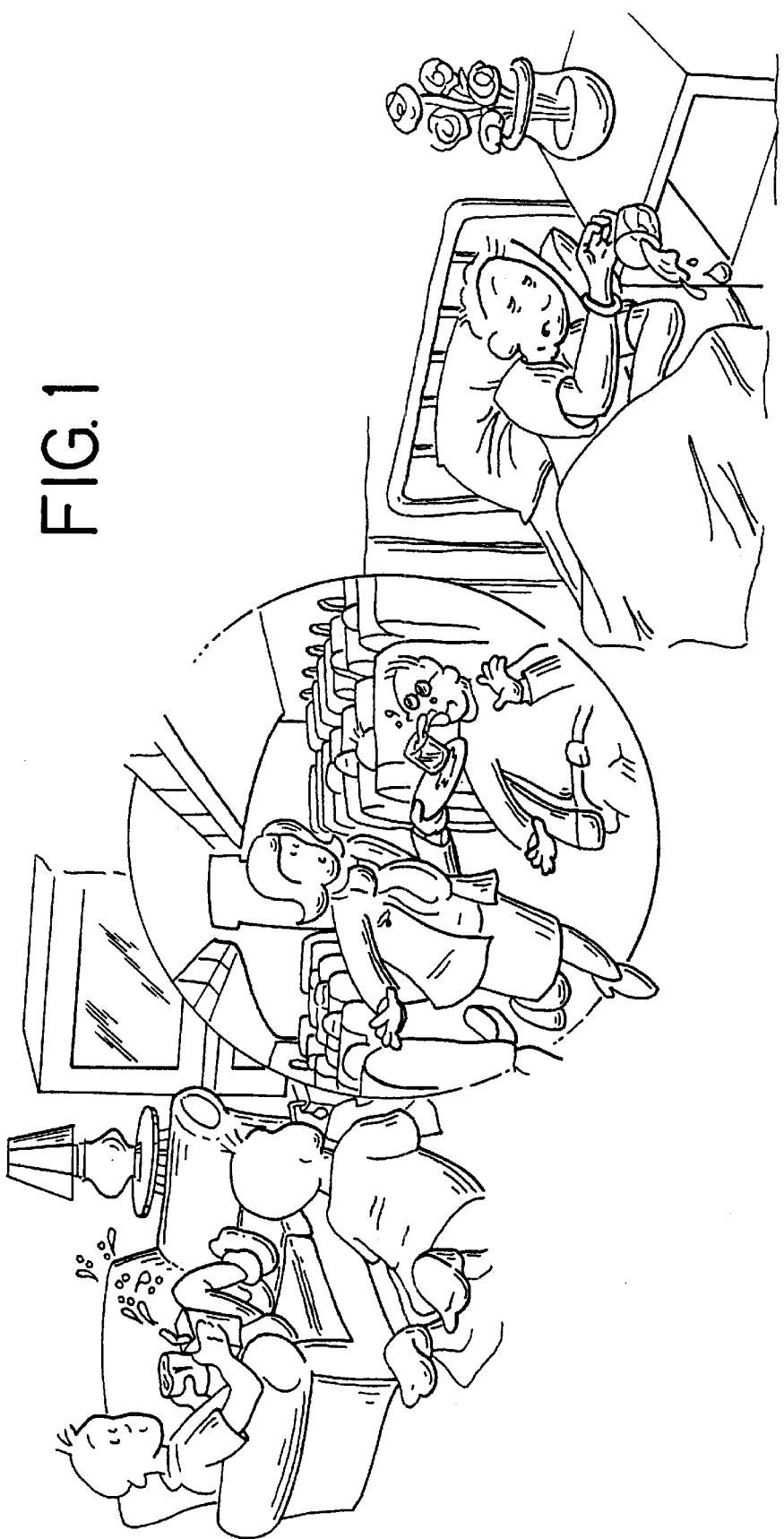
FIG. 1 shows a plurality of schematic views illustrating problems encountered with prior art fluid containers.

While this invention is susceptible to embodiments in many different forms, there are shown in the drawings and will herein be described in detail, preferred embodiments of the invention with the understanding that the present disclosures are to be considered as exemplifications of the principles of the invention and are not intended to limit the broad aspects of the invention to the embodiments illustrated.

Figure 2:
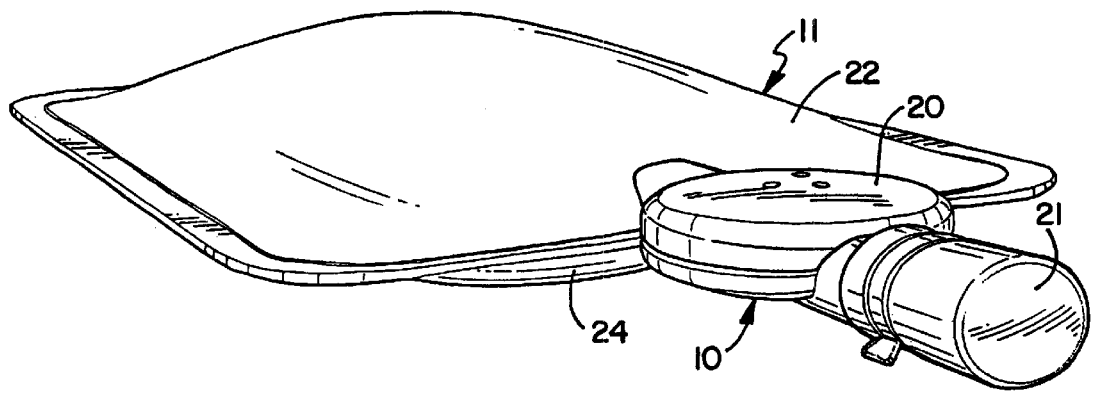
FIG. 2 is a perspective view of a vacuum demand flow valve of the present invention attached to a flexible fluid container.

FIG. 2 discloses a vacuum demand flow valve, generally referred to with the reference numeral 10, attached to a flexible fluid container 11. It is understood that the valve 10 can be used with various types of containers that contain a flowable material or substance. Thus, the shape of the container 11 can be arbitrary. The structure of the valve 10 will first be described followed by a description of the operation of the valve 10. Other embodiments of the valve will also be described.

As shown in FIGS. 2–7, the valve 10 generally includes a housing 12. The valve 10 also includes a diaphragm 14, a stop 18, and a radially extensive plug 70 which, can be considered in combination to be a valve member. Similarly, equivalent valve members shall be subsequently shown in other embodiments of the instant invention having differing reference numerals. Also shown is a diaphragm cover 20 and a cap 21. The valve 10 is adapted to be connected to the container 11. The container 11 may be formed as to have a first sidewall 22 and a second sidewall 24. The valve 10 allows for dispensing flowable materials from the container 11. The container 11 defines a reservoir for holding flowable materials. As discussed in greater detail below, the diaphragm member 14 is a flexible member that can be actuated by a user through the use of a vacuum pressure or a positive, external force.

As shown in FIG. 5, the housing 12 has a generally tubular structure defining a passageway 26 for a flowable material to pass therethrough. The housing 12 has a first opening 28 defining a valve outlet and a second opening 30, or inlet opening 30 adapted to be in communication with the container 11. The passageway 26 is between the valve outlet 28 and the inlet opening 30. The housing 12 further generally has an upper wall 32 and a lower wall 34. The walls 32,34 of the housing 12 cooperatively define a first housing section 36 and a second housing section 38. The first section 36 defines a first chamber 40 and the second section 38 defines a second chamber 42. In certain embodiments, the passageway 26 can only comprise the first chamber 40. The first section 36 has a port member 44 that has one end defining the first opening 28 of the housing 12. The port member 44 is generally a tubular structure and is sized such that, in an embodiment that is adapted to be useable by a person directly, a user's mouth can fit comfortably over the port member 44. Thus, the port member 44 can be considered a mouthpiece for the user. In an embodiment that is adapted to be used in conjunction with a pump or a syringe, an appropriately shaped port member would be supplied. The port member 44 also has an orifice 46 having a lesser diameter than the remainder of the passageway 26. This will be described in greater detail below. The orifice 46 could comprise a plurality of orifices. It is understood that the nomenclature of the first and second sections and chambers can be reversed.

The housing 12 further has an internal, or intermediate wall 48 extending between the upper wall 32 and the lower wall 34. The intermediate wall 48 has an inner opening 50. The inner opening 50 can be considered a second opening. The intermediate wall 48 further has an underside surface 52. The intermediate wall 48 generally divides the housing 12 to define the first chamber 40 and the second chamber 42. The first chamber 40 can be considered a downstream side of the valve 10 and the second chamber 42 can be considered an upstream side of the valve. The inner opening 50 will be in communication with the fluid container 11 via the second chamber 42. The second chamber 42 can include the fluid container 11.

The upper wall 32 has a generally circular opening 54 defined by an annular rim 56. The circular opening 54 is adapted to receive the diaphragm 14 to be described in greater detail below. The annular rim 56 has a lip 58. A front portion of the annular rim 56 cooperates with a vertical wall 60 of the port member 44 to define a groove 62.

As further shown in FIG. 5, the diaphragm 14 is a resilient, deflectable member that in one preferred embodiment, is generally circular in shape. The diaphragm 14 has a central portion 64 and an annular peripheral edge 66 defining a flange 68. The diaphragm 14 is connected to the housing 12 and is received by the circular opening 54. The flange 68 cooperates with the lip 58 of the annular rim 56. The diaphragm 14 is slightly under-sized as compared to the annular rim 56 wherein the elastomeric properties of the diaphragm 14 ensure a seal between the diaphragm 14 and the rim 56. Once connected, the diaphragm 14 can be considered a portion of the housing 12 that is flexible and deflectable from a first position to a second position to open the valve 10 as described below as well as being capable of being biased towards the first position due to either the structural properties of the assembly or the mechanical properties of the diaphragm 14. Thus, in a preferred embodiment, the diaphragm 14 comprises the flexible portion of the housing 12.

As also shown in FIG. 5, the stop member 18 is generally a plug member having a flange 70 at one end. The stop member 18 depends from a central portion 64 of the diaphragm 14 and extends through the internal opening 50. The flange 70 abuts the underside 52 of the intermediate wall 48 to define a closed valve position. The flange 70 can be considered a plug that is radially extensive from the stop 18 and sized to close the inner opening 50. The plug, or flange 70 can be considered to be located toward an upstream side of the valve from the stop. The upstream side of the valve can be considered generally at the second chamber 42 and the downstream side of the valve can be generally considered at the first chamber 40. In a preferred embodiment, the stop member 18 and the diaphragm 14 can be integrally molded together so as to form the valve member aforedescribed. As described in greater detail below, the resiliency of the diaphragm 14 biases the stop member 18 against the internal opening 50 to define a closed valve position. The flange 70 abuts the underside surface 52 of the internal wall 48.

Figure 3:
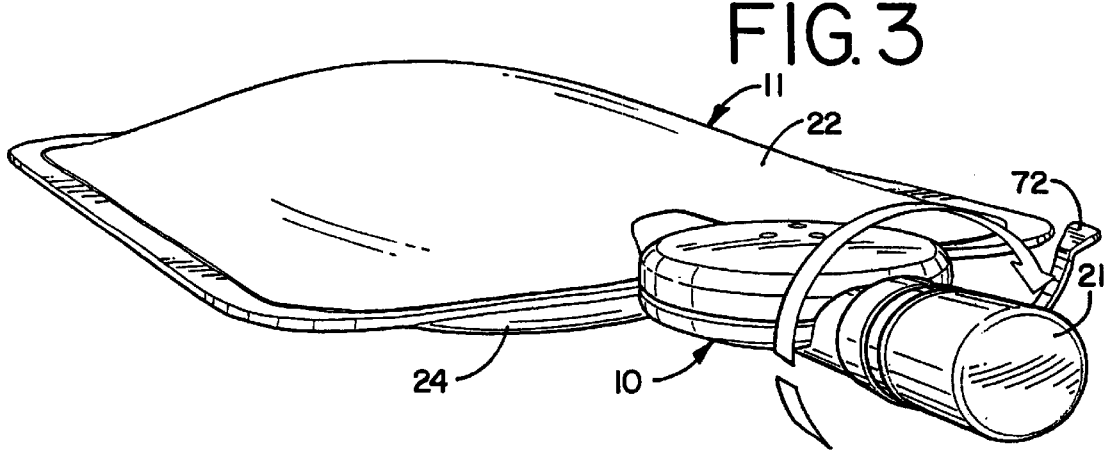
FIG. 3 is a perspective view of the container of FIG. 2 showing removal of a tamper evident strip.

In one preferred embodiment, the valve 10 utilizes the diaphragm cover 20. The diaphragm cover 20 is positioned over the diaphragm 14. The diaphragm cover 20 has a collar 65 that fits around the flange 68 of the diaphragm 14. The diaphragm cover 20 can fit within the groove 62 at a front portion of the valve 10. The diaphragm cover 20 is sized to assist in the compression of the diaphragm 14 around the annular rim 56. The diaphragm cover 20 helps protect the valve 10 from accidental activation. As shown in FIGS. 2 and 3, if desired, the valve 10 can also be equipped with the cap 21 that is press-fit over the port member 44. A tamper evident sealing member 72 can also be included. The tamper evident sealing member 72 seals the cap 21 to the housing 12 and gives a visual indication of whether the valve 10 has been tampered with or previously manipulated. It is understood that the valve components can be connected through a variety of processes including radio frequency or ultrasonic welding as well as solvent bonding or other methods as appropriate for the materials used.

Figure 4:
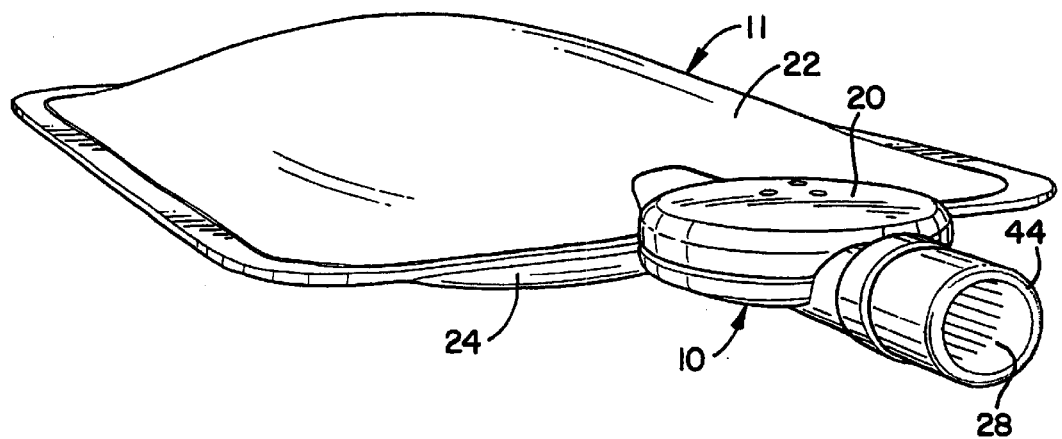
FIG. 4 is a perspective view of the valve and container wherein a cap of the valve is removed.

As discussed, in one preferred embodiment, the valve 10 is attached to a fluid container 11. The container may either be formed from a single web or may have a flexible first sidewall 22 and flexible second sidewall 24. In the configuration and as shown in FIGS. 2, 3, and 4, the valve 10 is inserted between peripheral edges of the sidewalls 22,24. The upper wall 32 is generally connected to the first sidewall and the lower wall 34 is generally connected to the second sidewall 24.

As shown in FIG. 5, the container 11 is shown in a configuration having a single circumferential sidewall as may be formed by blow molding and the like.

Prior to operation of the valve 10, the cap 21 is secured to the housing 12 by the tamper evident strip 72. As shown in FIGS. 3 and 4, the tamper evident strip 70 is peeled away and the cap 21 removed to expose the port member 44.

FIGS. 5–7 disclose operation of the valve 10. In an initial state, and as shown in FIG. 5, the valve 10 is in a closed position wherein the stop member 18 is biased against the underside surface 52 to close the inner opening 50. The valve member is subject to a first force operative to keep the valve 10 closed. In this first position, the first chamber 40 of the passageway 26 has a first volume V1. An external surface 15 of the diaphragm 14, and therefore the combination of the diaphragm 14, the stop 18, and the flange 70, which in combination can be referred to as a valve member, is generally subject to, and is sensitive to, an index pressure PI. The index pressure could be, for example, ambient pressure with the cap 20 being vented, or some other pressure resident in the interstice between the diaphragm 14 and the cap 20. The valve member is indexed against this index pressure PI. The first chamber 40 is also generally subjected to a pressure PI which could be approximately equal to or greater than the index pressure PI.

The second chamber 42 and the container 11 may also be at an ambient pressure, or at some pressure substantially at or above the index pressure PI. The pressure in the second chamber 42 and container 11 may be referred to as PC. The pressure in the container 11 will not be substantially less than the pressure in the first chamber 40. As shown in FIG. 6, a user places their mouth over the port member 44 and reduces the pressure through the first chamber 40 of the passageway 26. This reduced pressure can be referred to as P2. The partial vacuum provides a pressure less than the index pressure. As shown in FIG. 6, the vacuum acts on a lower surface 74 of the diaphragm 14 causing the index pressure on the upper surface of the diaphragm to apply a force on the diaphragm 14 equal to the difference between the index pressure and the pressure of the partial vacuum times the area of the diaphragm 14, drawing it downwards. This moves the stop member 18 downwards in the direction of arrow A, and into the second chamber 42 towards the container 11. The flange 70 is spaced away from the inner opening 50 thus opening the valve 10. This occurs when the force applied overcomes a first force associated with the diaphragm 14 that maintains the stop member 18 to close the internal opening 50. This force may be, preferedly, a resilient spring force associated with the diaphragm structure or, in other embodiments, be due to an index pressure substantially below the initial pressure in the first chamber acting on the diaphragm 14; or a force due to pressure in the container 11 acting on the area of plug 70; or may be applied by an external means as exemplified by the spring 164 in FIG. 18. In this second position, the first chamber 40 of the passageway 26 has a second volume V2. The second volume V2 is less than the first volume V1 as the diaphragm 14 is moved closer to the intermediate wall 48. It is also understood the area between the diaphragm 14 and the cover 20 increases to a volume of V3 in this position. In this position, the flowable material such as a drink fluid, as shown, is allowed to flow from the container 11, through the inner opening 50 in the direction of arrow B, through the passageway 26 and out the first opening 28 to be consumed by the user. Thus, when a vacuum is applied, a force is applied to the housing 46 in a first direction (arrow A) in response to the vacuum thereby placing the passageway 48 in the second position, wherein fluid flows through the passageway in a second direction generally shown as arrow C in FIG. 6. Thus, when a differential between the second pressure and the index pressure is provided to the valve member, the valve 10 opens when the second pressure is sufficiently less than the index pressure to overcome the first force operative on the valve member. The container 11 is adapted to supply constant pressure when the valve 10 is open, such as a flexible container 11 or a rigid container having a vent. It is understood the valve 10 is operable even if the container 11 is pressurized.

It can be further understood that the valve member is subject to a first force, as described hereabove, operative to keep the valve 10 closed. The valve member, i.e., the combination of the diaphragm 14, the stop 18, and the flange 70, supplies this biasing force as aforesaid. The valve member is sensitive to the index pressure. The outlet 28 of the valve 10 is subject to a second pressure. The index pressure provides a second force in opposition to the first force when a differential between the second pressure and the index pressure is provided to open the valve such that the second pressure is sufficiently less than the index pressure, multiplied by the area of the valve member, to overcome the first force. As shown in FIG. 6, the vacuum acts on a lower surface 74 of the diaphragm 14 causing the index pressure on the upper surface of the diaphragm to apply a force on the diaphragm 14 equal to the difference between the index pressure and the pressure of the partial vacuum times the area of the diaphragm 14, drawing it downwards. This moves the stop member 18 downwards in the direction of arrow A, and into the second chamber 42 towards the container 11. The flange 70 is spaced away from the inner opening 50 thus opening the valve 10. This occurs when the second pressure is sufficiently less than the index pressure wherein the force applied overcomes the resilient spring force or other sources of the force associated with the diaphragm 14 that biases the stop member 18 to close the internal opening 50.

As shown in FIG. 7, once the vacuum is removed, the valve 10 returns to the first or closed position. Thus, when the second pressure is substantially equal to or greater than the index pressure, the valve 10 closes. The resiliency of the diaphragm 14 biases the stop member 18 against the underside surface 52 of the intermediate wall 48 to close the inner opening 50 and therefore the valve 10. Fluid that passes through the port member 44, after the vacuum has been removed, is consumed by the user. The change between the first volume V1 and the second volume V2 provides for an action that serves to withdraw the fluid from the outlet 28 back into the outlet passageway 29 such that the linear distance the fluid is withdrawn into the outlet passageway 29 is equal to the difference between the volume V2 and the volume V1 divided by the area of the outlet 28 which is sufficient to draw the fluid toward the passageway 26 and away from the outlet 28. Fluid that remains in the passageway 26 at the reduced diameter orifice 46 when the vacuum is removed, however, does not drip from the valve 10. The orifice 46 is sized in the port member 44 such that surface tension ST of the fluid across the orifice 46 maintains the fluid in the passageway 48 once the vacuum is removed. The molecules of the fluid will experience an inward force from the other fluid molecules wherein the fluid will act like an elastic sheet across the orifice 30. Molecules at the edges of the orifice will be attracted to the surfaces of the housing 12 defining the orifice 30. Thus, due to surface tension ST of the fluid, the fluid already in the passageway 26 cannot pass through the orifice 46 until a vacuum is again applied.

It can be understood that in this valve configuration as disclosed in FIGS. 2–7, the second chamber 42 of the passageway 26 of the valve 10 is in communication with the container 11. The second chamber 42 can include the container 11. The stop member 18 and the inner opening 50 can define a simple valve. In an initial state, the upper surface 15 of the diaphragm 14 is subject to an index pressure PI. In one embodiment, the index pressure PI can be ambient pressure. Also in the initial state, the first chamber 40 of the passageway 26 could also be under some different first pressure P1 or the index pressure PI. The second chamber 42 would be under a second pressure PC which also could typically be ambient pressure. The container 11 is also initially under the container pressure PC. This pressure could be ambient pressure. When a partial vacuum is applied, the first chamber 40 is now under a second pressure P2 that is less than the index pressure PI. In this state, the valve moves from a closed position to an open position wherein the fluid is allowed to flow through the outer opening 50. Thus, the valve operates to selectively place the first chamber 40 into communication with the second chamber 42. Accordingly, a differential pressure is applied across the diaphragm 14 causing the valve 10 to open and allow fluid to pass through the opening 50. In one preferred embodiment, the pressure differential occurs from ambient pressure, wherein the index pressure is at ambient pressure and the housing chamber is subjected to a negative pressure. Thus, the valve 10 is actuated by applying a pressure less than ambient pressure. It is understood that a pressure differential could also be applied from an initial pressure not equal to ambient pressure. One could also consider the index pressure a third pressure wherein the first chamber is subject to a first pressure and the second chamber is subject to a second pressure at least substantially equal to the first pressure. The valve is indexed against the third pressure. The valve operates to selectively place the first chamber into communication with the second chamber when the first pressure is less than the third pressure, or index pressure. FIG. 8 further illustrates the pressures, and forces associated with the pressures, that act on the valve member during operation of the valve 10. The index pressure exerts an index force FI on an outer surface of the diaphragm 14. Prior to operation, the first chamber has a first pressure P1 and a first force F1 acting on an inner surface of the diaphragm 14 serving to balance the remaining forces acting on the valve. The container pressure PC and container force FC also acts on the valve member at the plug 70. A biasing force FB also acts on the valve member and is, in certain embodiments, supplied by the structure of diaphragm 14. When the first pressure P1 is reduced to a new pressure P2, a force F2 (less than F1) is applied to the diaphragm 14. The resultant force acting on the diaphragm 14 to open the valve 10 can be represented by the following vector formula: FR (resultant force) AD(PI−P2)−AP(PC)−FB wherein AD is the area of the diaphragm 14 and AP is the area of the plug 70.

It is understood that the valve 10 can operate without utilizing the diaphragm cover 20. FIG. 8 discloses a simplified version of the valve 10 wherein a diaphragm cover 20 is not used. The diaphragm 14 can comprise a flexible portion of the housing 12. Upon actuation, this housing portion would flex to move the stop member 18 away from the inner opening 50.

It is further understood that the vacuum to actuate the valve 10 is typically applied by a user reducing the pressure through the passageway 26. The vacuum could also be applied by other means such as a syringe 51 as shown in FIG. 9. A vacuum could also be applied by a pump or other mechanical means. Finally, it is understood that the designations of "first" and "second" with respect to the chambers, pressures and valve positions can be interchanged.

In an alternative method of valve actuation, a user can depress the diaphragm 14 through the cover 20 to move the stop member 18 away from the inner opening 50. Fluid is then allowed to pass through the passageway 26 and out the outer opening 28.

It is understood that the valve 10 can be incorporated into a tubing. A portion of the tubing can be flexible and provide the diaphragm 14. An opposite portion of the tubing can be provided with the opening 50 to be communication with the container 11. The stop member 18 can be provided between the diaphragm 14 and opening 50.

It is further understood that the valve 10 could be constructed with multiple chambers and diaphragms or connected to a manifold designed to be in communication with separate chambers of a multi-chambered container. Different fluids, stored separately, could then be consumed together.

The valve components can be made from a variety of materials. The materials can be selected based on the intended use of the valve 10. In one embodiment, such as the valve being used with drink containers, the valve components can be made from a variety of polymers or other structurally suitable materials. Other materials are also possible. The choice of materials is only related to the fluid and use the valve is to be applied to. For example, should this valve be used in the fuel or oxidizer supply section of a rocket engine with an injection pump providing a partial vacuum and the index pressure externally applied; the valve member and housing may be made out of stainless steel.

Figure 11:
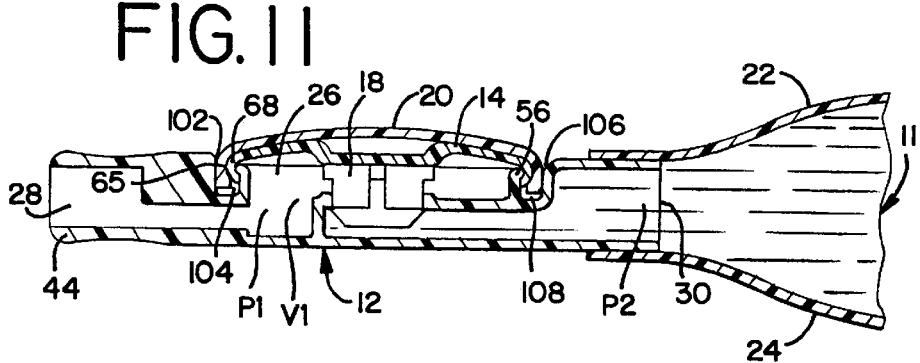
FIG. 11 is a partial cross-sectional view of another embodiment of the vacuum demand flow valve of the present invention and the container, the valve being shown in a closed position.
Figure 12:
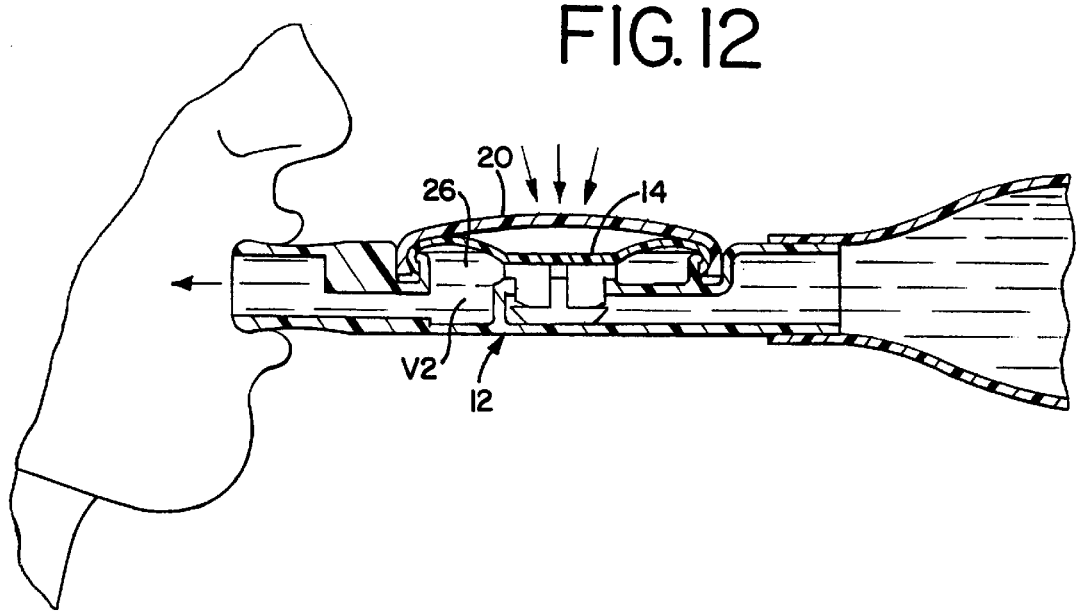
FIG. 12 is a partial cross-sectional view of the valve and container of FIG. 1, the valve being placed in an open position by a user.
Figure 13:
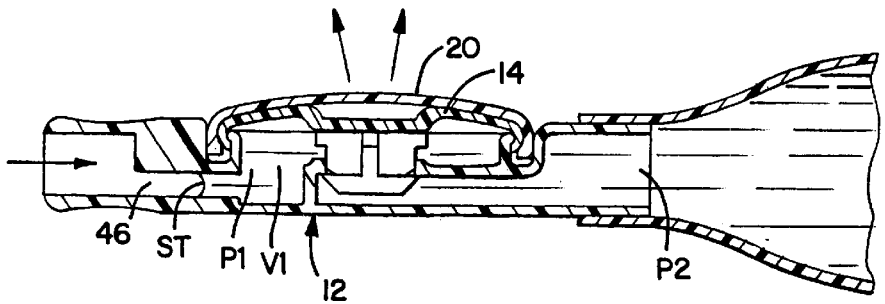
FIG. 13 is a partial cross-sectional view of the valve and container of FIG. 11, the valve returned to a closed position.

FIGS. 10–14 disclose another embodiment of the vacuum demand flow valve of the present invention, generally referred to with the reference numeral 100. The vacuum demand flow valve 100 is similar to the valve 10 disclosed in FIGS. 2–7 and similar elements will be referred to with identical reference numerals. As shown in FIG. 11, the upper wall 32 of the housing 12 has the generally circular opening 54 defined by the annular rim 56. Proximate a front portion of the housing 12, the upper wall 32 has a first vertical wall 102. The first vertical wall 102 cooperates with the annular rim 56 to define a first groove 104. Proximate a rear portion of the housing 12, the upper wall 32 has a second vertical wall 106. The second vertical wall 106 cooperates with the annular rim 56 to define a second groove 108. As discussed previously, the diaphragm 14 is connected to the annular rim 56 wherein the flange 68 cooperates with the lip 58 of the annular rim 56. The diaphragm cover 20 is positioned over the diaphragm 14 wherein the collar 65 fits around the flange 68 of the diaphragm 14. The diaphragm cover 20 fits snugly within the first groove 104 and the second groove 108. FIG. 12 shows the valve 100 in an open position wherein a partial vacuum has been applied through the passageway 26. It is understood that the stop 18 as shown in FIG. 12 is structured to allow flow through the inner opening 50 and out the outlet opening 28. In FIG. 13, the vacuum has been removed wherein the valve 100 returns to a closed position as discussed above. The fluid is drawn back into the orifice wherein it will not drip out of the valve 100.

FIGS. 10 and 14 disclose a slightly modified diaphragm cover/cap assembly 110. In this design, the assembly 110 has a collar 112, a cap 114 and a diaphragm cover 116. The collar 112 is connected to the cap 114 by a tamper evident strip 118 similar to the tamper evident strip 72 in FIG. 3. The diaphragm cover 116 is connected to the collar 112 by a flexible strap 120. FIGS. 14a–d disclose a general assembly of the valve 100. The diaphragm 14 is first connected to the housing 12 as discussed above. The cover/cap assembly 110 is then connected to the housing 112. The collar 112 and cap 114 are slid over the port assembly 44 of the housing 12. The diaphragm cover 116 is then pivoted and connected over the diaphragm 14 as shown in FIG. 14d. Prior to operation of the valve 110, the tamper evident strip 118 can be torn away to remove the cap 114 from the collar 112 to expose the port member 44 of the housing 12. The valve 100 is operated as described above.

Figure 15:
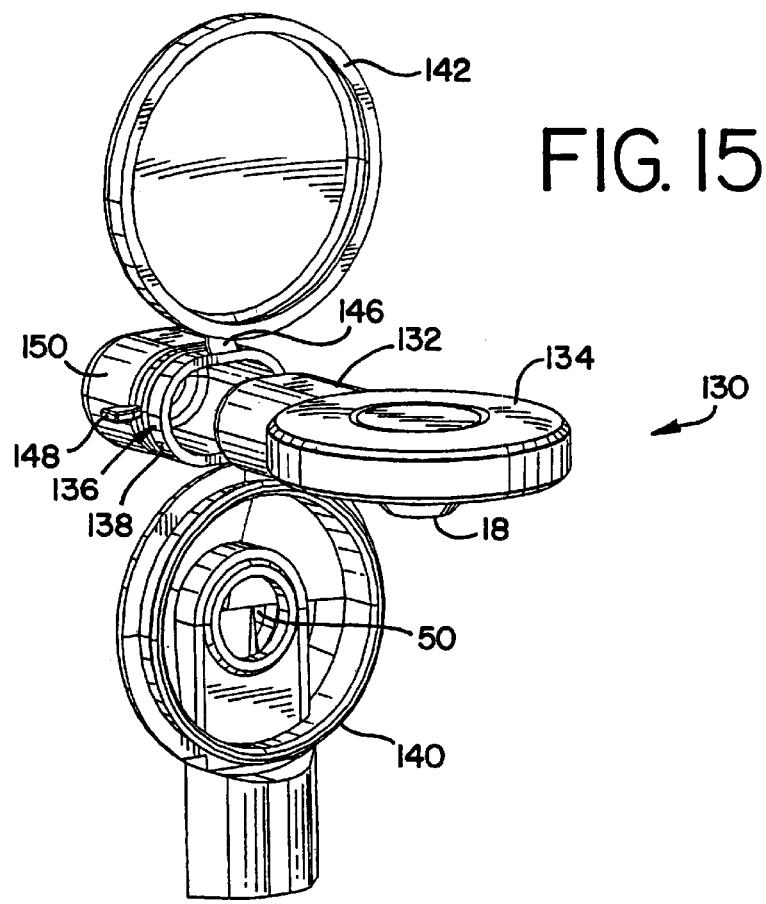
FIG. 15 is an exploded perspective view of another embodiment of the vacuum demand flow valve of the present invention.
Figure 16:
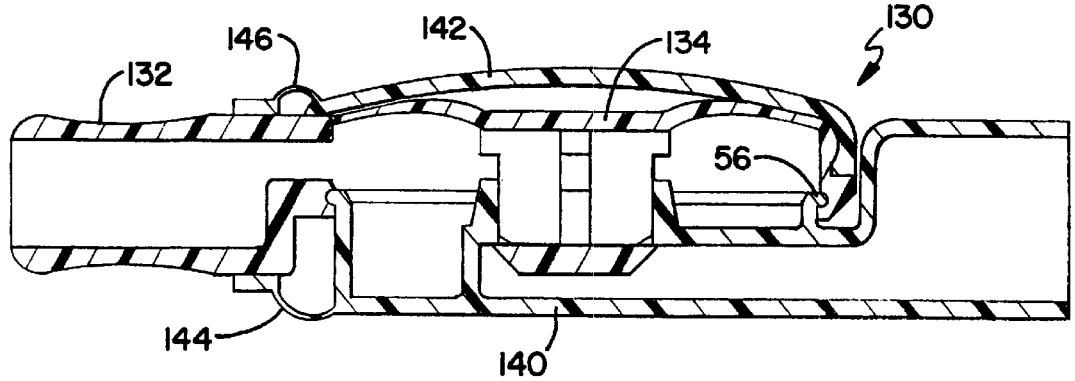
FIG. 16 is a cross-sectional view of the valve of FIG. 15, the valve being shown in a closed position.
Figure 17A:
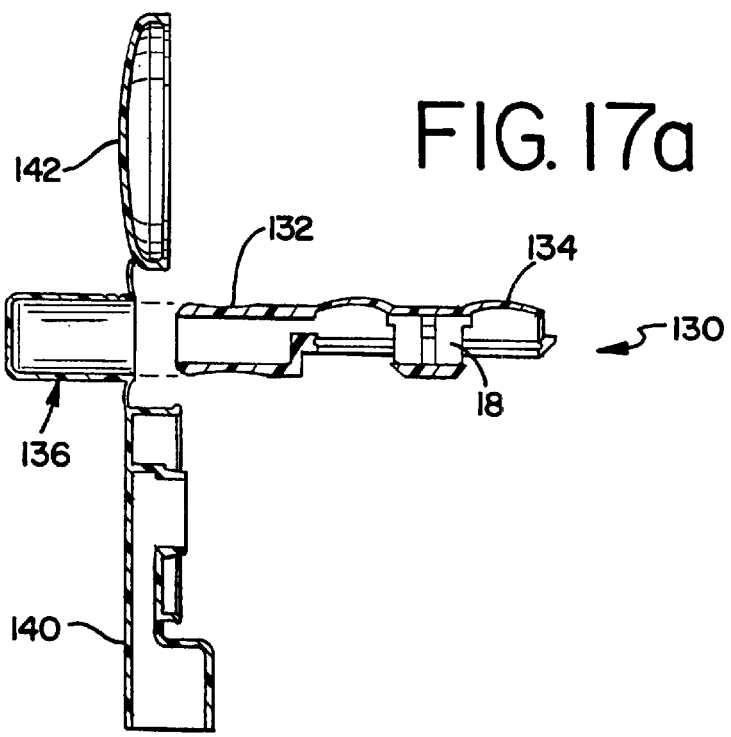
FIGS. 17a–c are cross-sectional views showing assembly of the valve of FIG. 15.
Figure 17B:
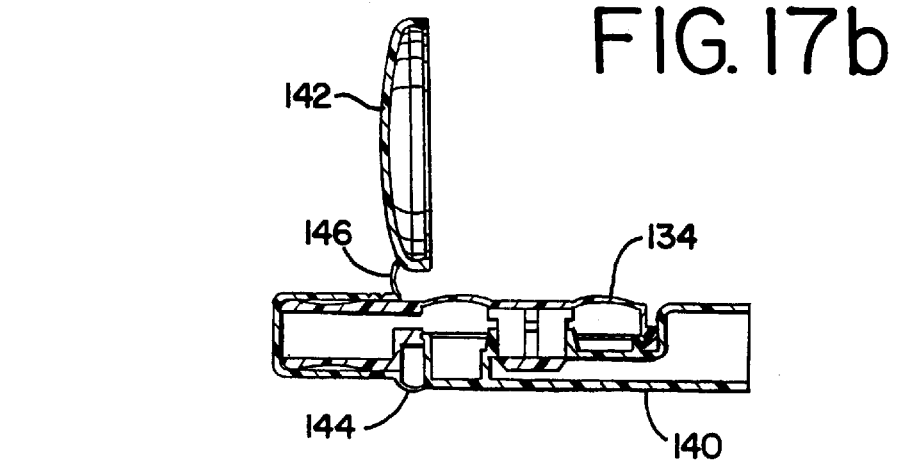
Figure 17C:
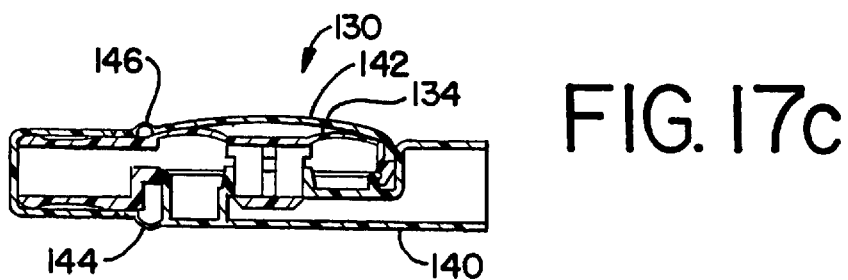

FIGS. 15–17 disclose another embodiment of the vacuum demand valve of the present invention, generally designated with the reference numeral 130. In this embodiment, the port member of the housing is separated and connected instead to the diaphragm member 14. As shown in FIGS. 15 and 16, a port member 132 is integrally connected to a diaphragm 134. A collar assembly 136 is provided having a collar 138, a housing 140 and a diaphragm cover 142. The housing 140 is connected to the collar 138 by a first flexible strap 144. The diaphragm cover 142 is connected to the collar 138 by a second flexible strap 146. The collar assembly 136 also has a tamper evident strip 148 connecting a cap 150 to the collar 138. FIGS. 17a–c disclose a general assembly of the valve 130. The port member 132 is inserted into the collar assembly 136. The housing 140 is pivoted about the first flexible strap 144 wherein the stop member 18 connected to the diaphragm 134 is inserted into the internal opening of the housing 140. The port member 132 and diaphragm 134 are connected to the annular rim 56 on the housing 140. The diaphragm cover 142 is pivoted about the second flexible strap 146 and connected over the diaphragm 134. The valve 130 is operated as described above.

Figure 18:
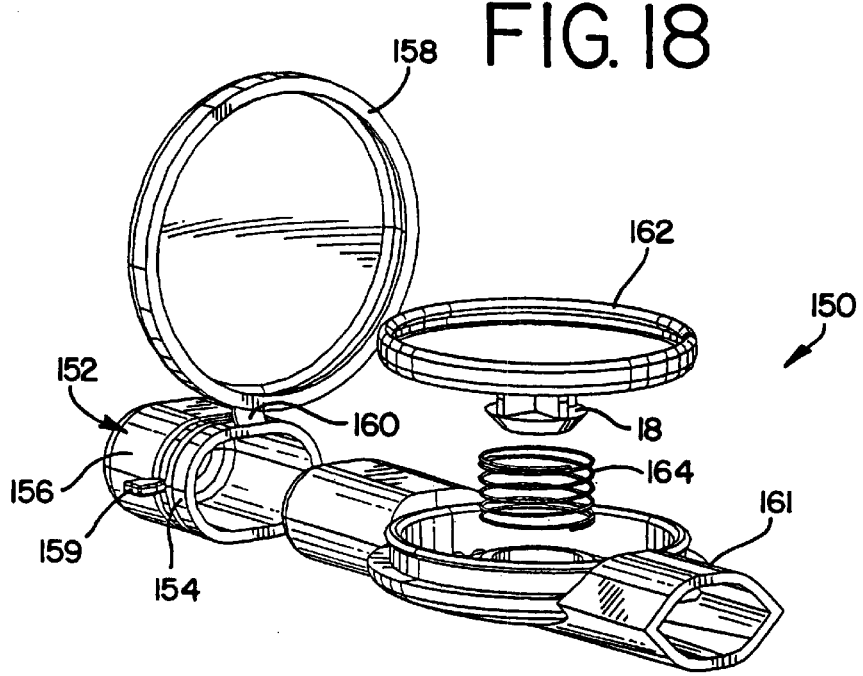
FIG. 18 is an exploded perspective view of another embodiment of the vacuum demand flow valve of the present invention.
Figure 19:
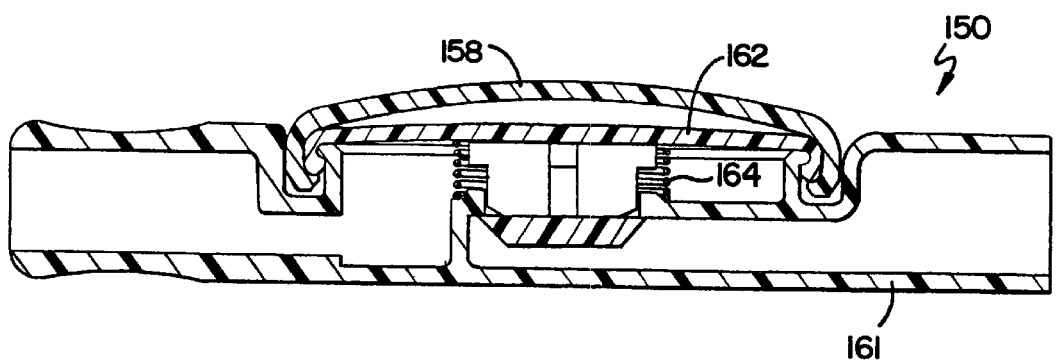
FIG. 19 is a cross-sectional view of the valve of FIG. 18, the valve being shown in a closed position.
Figure 20A:
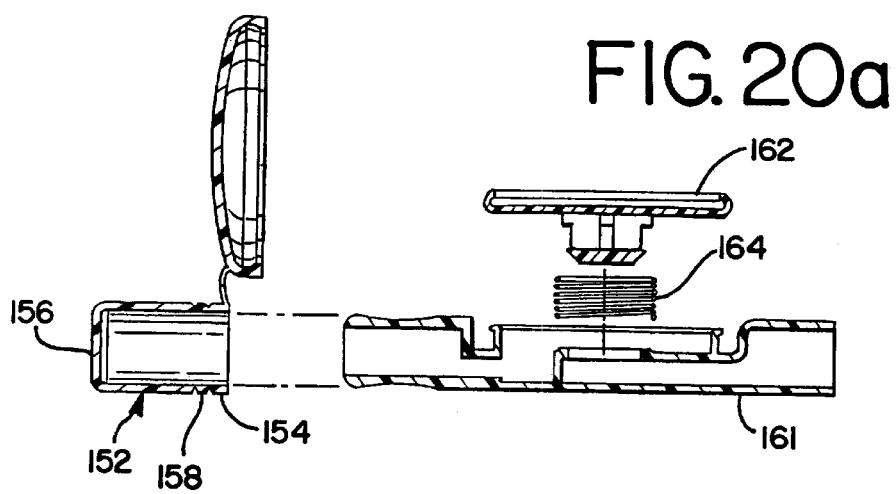
FIGS. 20a–d are cross-sectional views showing assembly of the valve of FIG. 18.
Figure 20B:
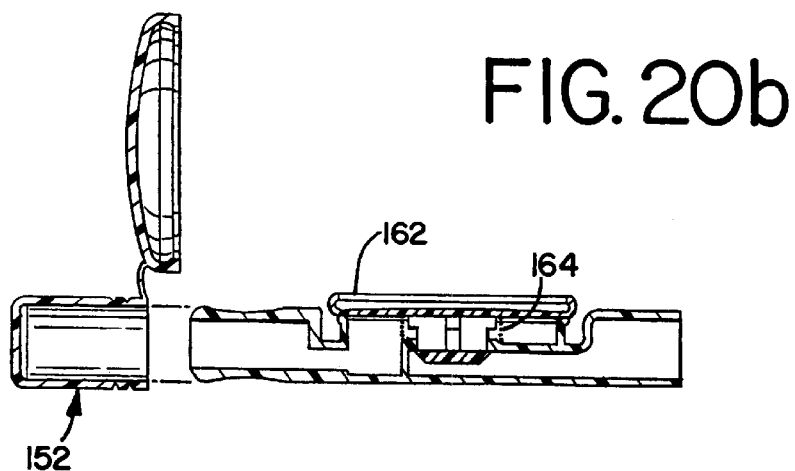
Figure 20C:
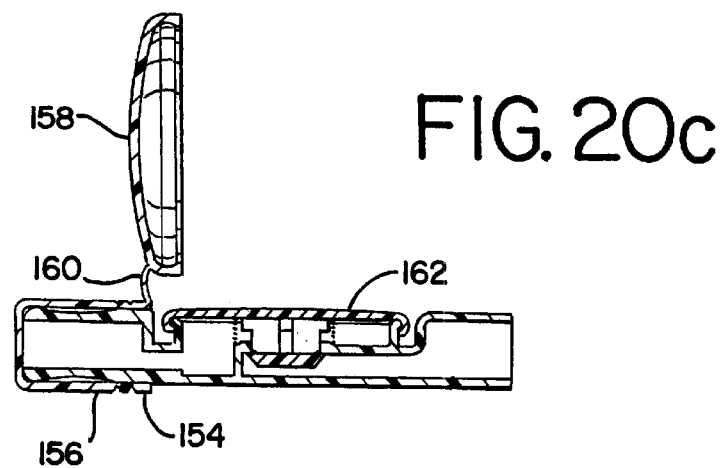
Figure 20D:
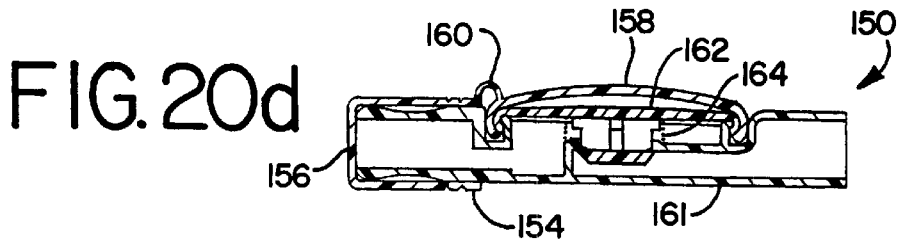
Figure 21:
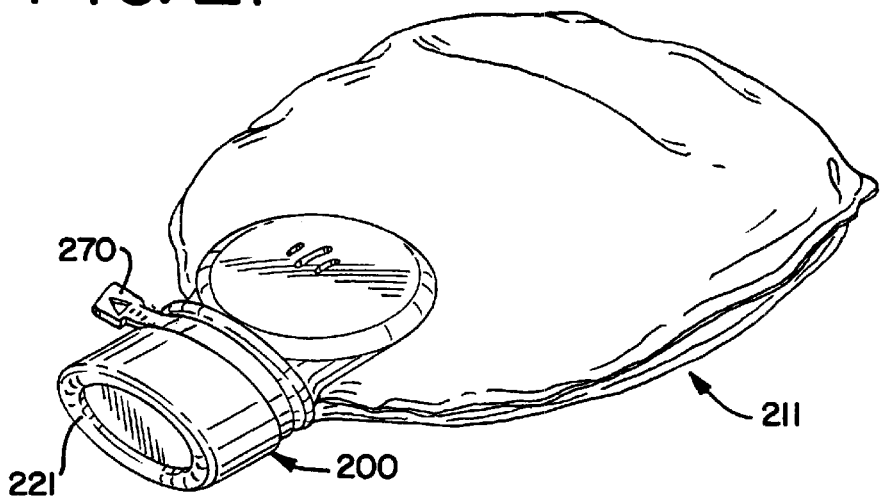
FIG. 21 is a perspective view of another embodiment of the vacuum demand flow valve of the present invention attached to a flexible fluid container.

FIGS. 18–20 disclose another embodiment of the vacuum demand valve of the present invention, generally designated with the reference numeral 150. As shown in FIG. 18, the valve 150 has a diaphragm cover/cap assembly 152. In this design, the assembly 152 has a collar 154, a cap 156 and a diaphragm cover 158. The collar 154 is connected to the cap 156 by a tamper evident strip 159 similar to the tamper evident strip 72 in FIG. 3. The diaphragm cover 158 is connected to the collar 154 by a flexible strap 160. The valve 150 utilizes a housing 161 and a diaphragm 162. The diaphragm 162 is biased towards a closed position by a spring 164. The spring 164 is positioned around the stop member 18 wherein one end abuts the intermediate wall of the housing 161 and another end abuts an underside surface of the diaphragm 162. FIGS. 20a–d disclose a general assembly of the valve 150. The spring 164 is on the intermediate wall of the housing 161 and the diaphragm 162 connected to the housing 162 via the annular rim 56. The housing 161 is inserted into the assembly 152 as shown in FIG. 20c. The diaphragm cover 158 is then pivoted via the flexible strap 160 and connected over the diaphragm 162. FIG. 19 shows the valve 150 utilizing a separate diaphragm cover 158 similar to the valve construction shown in FIG. 11. The valve 150 is operated as described above.

FIGS. 21–25 disclose yet another embodiment of the vacuum demand valve of the present invention. This valve, generally referred to with the reference numeral 200, is shown attached to a flexible fluid container 211. It is understood that the valve 200 can be used with various types of containers that contain a flowable material or substance. The structure of the valve 200 will first be described followed by a description of the operation of the valve 200.

As shown in FIG. 24, the valve 200 generally includes a port member 212, a first member or diaphragm member 214, a second member or base member 216, a stop member 218, a diaphragm cover 220 and a cap 221. The valve 200 is adapted to be connected to the container 211 that has a first sidewall 222 and a second sidewall 224. The valve 200 allows for dispensing flowable materials from the container 211. As discussed in greater detail below, the diaphragm member 214 is a flexible member that can be actuated by a user through the use of a vacuum pressure or a positive, external force.

Figure 23:
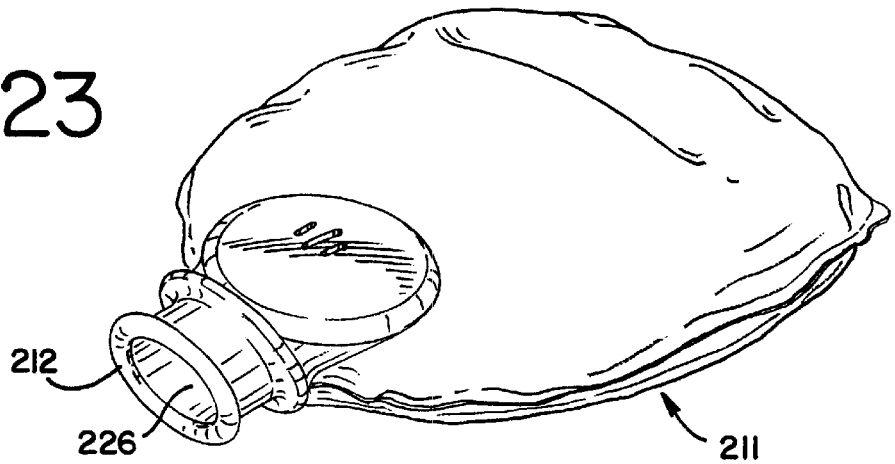
FIG. 23 is a perspective view of the valve and container wherein a cap of the valve is removed.

As further shown in FIGS. 24 and 25, the port member 212 is generally a tubular structure and defines an outlet or outer opening 226. The port member 212 is sized such that a user's mouth can fit comfortably over the port member 212. In one preferred embodiment as shown in FIG. 23, the port member 212 has an elliptical shape. The port member 212 has a disk-shaped member 228 having an orifice 230 (FIG. 24).

The base member 216 is an elongated member that extends from a bottom portion of the port member 212. The base member 216 has a first end 232 that extends from the port member 212. A second end 234 of the base member 216 is connected to one end of the diaphragm 214 at an intermediate location 236 to be described in greater detail below. The base member 216 has an inner opening 238. The inner opening 238 will be in communication with the fluid container 211. The diaphragm 214 is a flexible member having one end 240 extending from an upper portion 242 of the port member 212. The diaphragm 214 has a second end 244 that is connected to the end 234 of the base member 216 at the intermediate location 236. As will be discussed in greater detail below, in one preferred embodiment when the valve 200 is attached to a flexible container 211, the diaphragm 214 will comprise a portion of one of the flexible sidewalls 222. The base member 216 and diaphragm 214 collectively comprise a housing 246 of the valve 200. A portion of the housing 246 is flexible from a first position to a second position to open the valve 200. In a preferred embodiment, the diaphragm 214 comprises the flexible portion of the housing 246. The port member 212 could also be included as part of the housing 246. The base member 216 and diaphragm 214 also collectively define a passageway 248 of the valve 200.

The stop member 218 is positioned generally between the diaphragm 214 and base member 216 within the passageway 248. The stop member 218 has an arm 250 and a plunger 252 having a plug 254 at a distal end of the plunger 252. The arm 250 is hingedly connected to the port member 212 by a flexible strap 256. The plunger 252 is connected to a distal end of the arm 250. The plunger 252 and the arm 250 are connected to a bottom surface 258 of the diaphragm 214. The plug 254 is positioned through the inner opening 238 and abuts a bottom surface 260 of the base member 216 to close the inner opening 238. The plunger 252 further has a pair of resilient members 262. The resilient members 262 bias the plug 254 against the bottom surface 260 of the base member 216 so that the plug 254 abuts against the bottom surface 260 to close the opening 238.

In one preferred embodiment, the valve 200 utilizes the diaphragm cover 220. The diaphragm cover 220 is positioned over the diaphragm 214. The diaphragm cover 220 has a collar 264 positioned around the port member 212 and connected proximately thereto. An opposite end of the diaphragm cover 220 is connected to the diaphragm 214 at the intermediate location 236. The diaphragm cover 220 has a vent 266. If desired, the valve 200 can also be equipped with the cap 221 that fits over the port member 212. A tamper evident sealing member 270 can also be included. The tamper evident sealing member 270 seals the cap 221 against the collar 264 and gives a visual indication of whether the valve 200 has been tampered with or previously manipulated.

As discussed, in one preferred embodiment, the valve 200 is attached to a fluid container 211 having flexible first sidewall 222 and flexible second sidewall 224. In this configuration and as shown in FIGS. 24 and 25, the valve 200 is inserted between peripheral edges of the sidewalls 222,224. The end 234 of the base member 216 is connected to an underside surface 272 of the first sidewall 222 at the intermediate location 236. The first sidewall 222 extends further wherein its peripheral edge is connected to the valve 200 proximate the port member 212. In this configuration, the portion of the first sidewall 222 extending from the intermediate location 236 to the connection proximate the port member 212 comprises the diaphragm 214. The bottom or second sidewall 224 is connected proximate the base member 216 at the port member 212 to seal the valve 200 to the container 211. The inner opening 238 is in communication with the inner chamber of the container 211 defined by the flexible sidewalls 222,224. It is understood that the valve 200 could have a diaphragm 214 constructed from a member separate from the sidewall 222.

Figure 22:
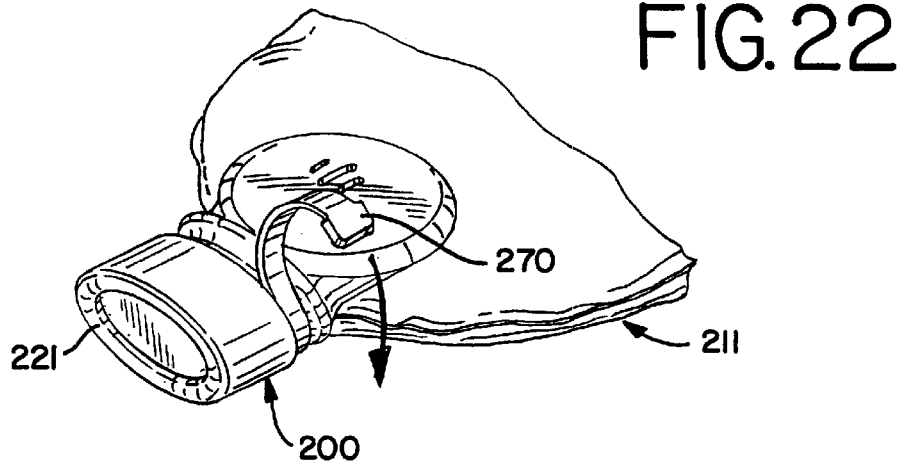
FIG. 22 is a partial perspective view of the container of FIG. 21 showing removal of a tamper evident strip.

Prior to operation of the valve 200, the cap 221 is secured to the valve 200 by the tamper evident strip 270. As shown in FIGS. 22 and 23, the tamper evident strip 270 is peeled away and the cap 221 is removed to expose the port 212.

FIGS. 24 and 25 generally disclose operation of the valve 200. In an initial state, and as shown in FIG. 24, the valve 200 is in a closed position wherein the plug 254 is biased against the bottom surface 260 to close the inner opening 238. In this first position, the passageway 248 has a first volume V1. The volume extends generally from the junction of the base member 216 and diaphragm 214 to the port member 212. A user places their mouth over the port member 212 and sucks to provide a partial vacuum through the passageway 248. The vacuum is a pressure less than an ambient pressure. As shown in FIG. 25, the vacuum acts on the lower surface 258 of the diaphragm 214 wherein the force associated with the index pressure forces the diaphragm 214 downwards. This moves the plunger 252 downwards in the direction of arrow A, wherein the plug 254 is spaced away from the inner opening 238 thus opening the valve 200. In this second position, the passageway 248 has a second volume V2. The second volume V2 is less than the first volume V1 as the diaphragm moved closer to the base member 216. It is also understood the area between the diaphragm 214 and the cover 220 increases to a volume of V3 in this position. In this position, the fluid is allowed to flow from the container 211, through the inner opening 238 in the direction of arrow B, through the passageway 248 and out the orifice 230 and outer opening 226 to be consumed by the user. Thus, when a vacuum is applied, a force is applied to the housing 246 in a first direction (arrow A) in response to the vacuum thereby placing the passageway 248 in the second position, wherein fluid flows through the passageway in a second direction generally shown as arrow C in FIG. 25.

Once the vacuum is removed, the valve 200 returns to the first position. The resilient members 262 bias the plug 254 against the bottom surface 260 of the base member 216 to close the inner opening 238 and therefore the valve 200. Fluid that passes through the orifice 230, after the vacuum has been removed, is consumed by the user. Fluid that remains in the passageway 248 when the vacuum is removed, however, does not drip from the valve 200. The change between the first volume V1 and the second volume V2 provides for an action that serves to withdraw the fluid from the outlet 238 back into the outlet passageway 229 such that the linear distance the fluid is withdrawn into the outlet passageway 229 is equal to the difference between the volume V2 and the volume V1 divided by the area of the outlet 238 which is sufficient to draw the fluid toward the passageway 248. The orifice 230 in the port member 212 is sized such that surface tension of the fluid across the orifice 230 maintains the fluid in the passageway 248 once the vacuum is removed. The molecules of the fluid will experience an inward force from the other fluid molecules wherein the fluid will act like an elastic sheet across the orifice 230. Molecules at the edges of the orifice will be attracted to the surface of the disk-shaped member 228 defining the orifice 230. Thus, due to surface tension of the fluid, the fluid already in the passageway 248 cannot pass through the orifice 230 until a vacuum is again applied. In an alternative embodiment shown in FIG. 25, the port member 12 can have a venturi structure 231 generally at the port member 212.

It can be understood that in this valve configuration as disclosed in FIGS. 21–25, the passageway 248 of the valve 200 defines a first chamber while the container 211 defines a second chamber. The plug 254 and inner opening 238 define a simple valve. In an initial state, the upper surface of the diaphragm 214 is subject to a first pressure, or index pressure PI. The passageway 248 could also be subject to the index pressure PI or some other first pressure. In one particular embodiment, the index pressure could be ambient pressure. The container 211 is subject to a container pressure PC. The container pressure could also be at ambient pressure. When a partial vacuum is applied by a user as shown in FIG. 25, the first chamber defined by the passageway 248 is subjected to a second pressure P2 that is less than the index pressure PI. In this state, the valve moves from a closed position to an open position wherein the fluid is allowed to flow through the outer opening 26. In one preferred embodiment, the index pressure PI represents ambient pressure, which in an equilibrium state is present in the passageway 248 and the container 211. In this initial state (FIG. 24), the index pressure PI is generally under ambient pressure and the plug 254 closes the opening 238.

When the second pressure P2 is applied to the passageway 248 that is less than ambient pressure, a vacuum is present. This results in a force acting on the diaphragm 214 as explained above drawing the diaphragm downwards wherein the plug 254 moves away from the opening 238 allowing fluid to pass through the opening 238. Thus, a differential pressure is applied across the diaphragm 214 causing the valve 200 to open and allow fluid to pass through the opening 238. In one preferred embodiment, the pressure differential occurs from an index pressure that is ambient pressure. Thus, the valve 200 is actuated by applying a pressure less than ambient pressure. It is understood that a pressure differential could also be applied from an index pressure not equal to ambient pressure. It is also understood that the vacuum is typically applied by a user reducing the pressure through the passageway. The vacuum could also be applied by other means such as a syringe. A vacuum could also be applied by a pump or other mechanical means. Finally, it is understood that the designations of "first," "second" and "third" with respect to the chambers, pressures and valve positions can be interchanged.

In an alternative method of valve actuation, a user can depress the diaphragm 214 through the cover 220 to move the plug 254 away from the inner opening 238. Fluid is then allowed to pass through the passageway 248 and out the outer opening 226.

The valve components can be made from a variety of materials. In preferred form of the invention, the valve components are made from an injection-molded process wherein the port member 12, base member 16 and portions of the stop member 18 are integrally molded. It is understood, however, that the valve components can be formed separately and connected to one another.

It is understood that the valve 10 can be incorporated into a tubing. A portion of the tubing can be flexible and provide the diaphragm 14. An opposite portion of the tubing can be provided with an opening to be in communication with the container 11. A stop member can be provided between the diaphragm 14 and opening.

Figure 26:
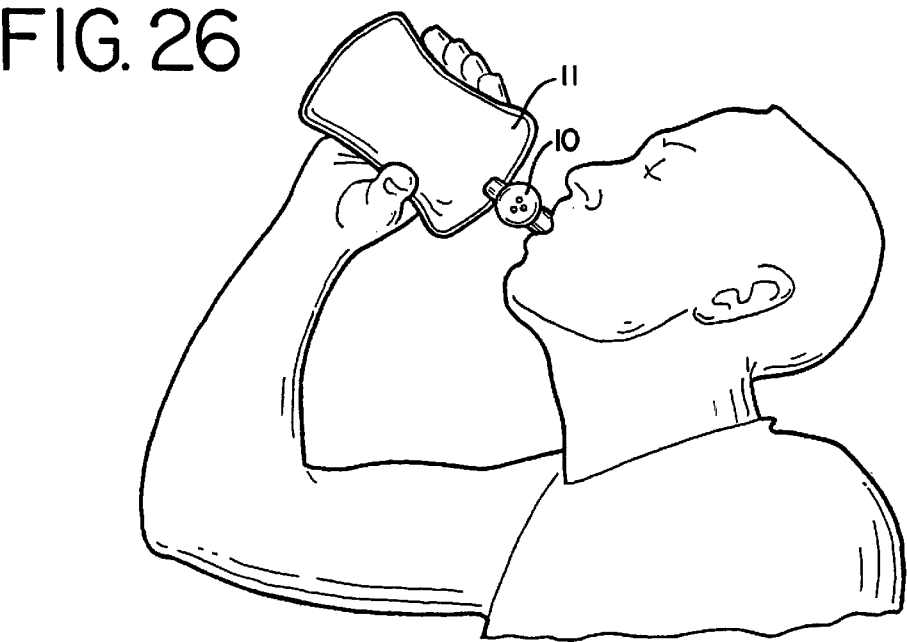
FIG. 26 is a schematic view of a user consuming a fluid from a container having a vacuum demand flow valve of the present invention.

Thus, a device 10 (as well as the other disclosed devices) is provided that is simple in construction and use. As shown in FIG. 26, the valve 10 connected to a container 11 can be easily actuated by a user merely by applying a vacuum through the port member 12. Fluid is consumed as needed and will not drip from the valve 10. In addition, due to the construction of the device 10, fluid cannot be expelled through the valve 10 by squeezing the flexible sidewalls 22,24 of the container 11. To the contrary, squeezing the sidewalls 22,24 provides a greater seal as the plug 70 is forced further against the intermediate wall of the housing. Thus, if the container II is accidently compressed, fluid will not spray through the valve 10.

Figure 27:
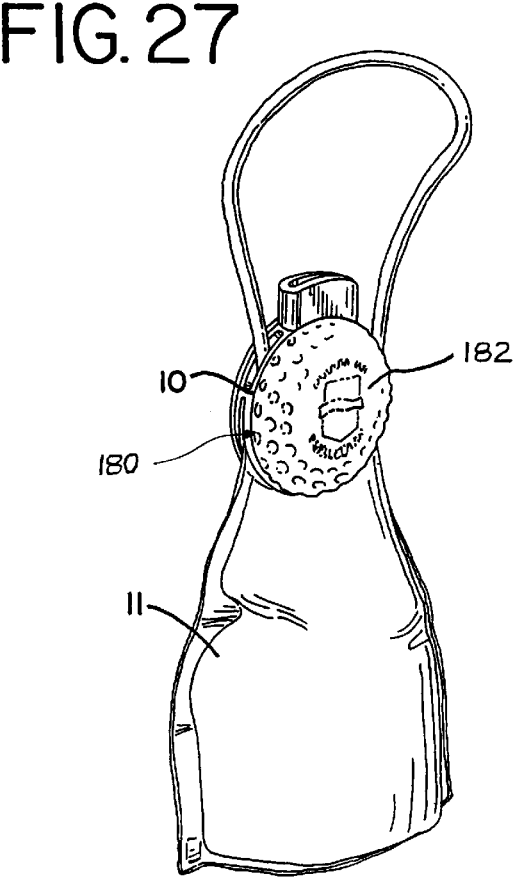
FIG. 27 is perspective view of a vacuum demand flow valve of the present invention attached to a fluid container, the valve having an indicia-bearing surface.
Figure 28:
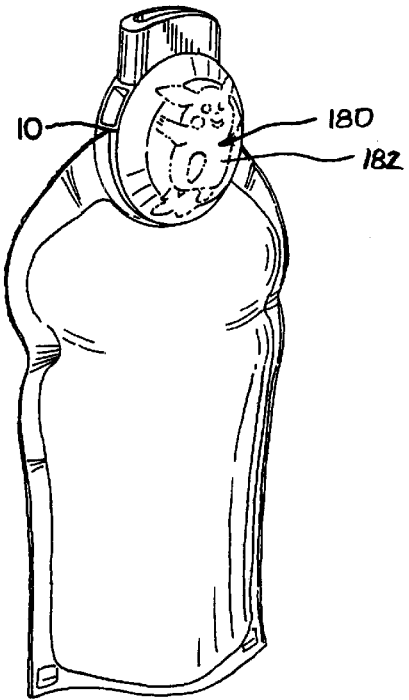
FIG. 28 is a perspective view of another vacuum demand flow valve of the present invention attached to a fluid container, the valve having an indicia-bearing surface.

As shown in FIGS. 27 and 28, the valve 10 can be constructed wherein, for example, the diaphragm cover 20 can have a distinctive shape 180 (FIGS. 27 and 28) or an indicia-bearing surface 182 (FIG. 28) for promotional purposes or to provide for branding opportunities.

Figure 30:
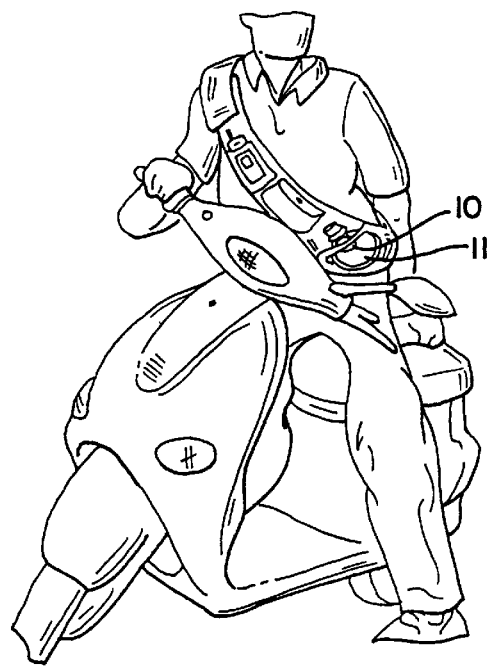
FIG. 30 is a schematic view showing another use of the vacuum demand flow valve of the present invention.
Figure 31:
FIG. 31 is a schematic view showing another use of the vacuum demand flow valve of the present invention.
Figure 32:
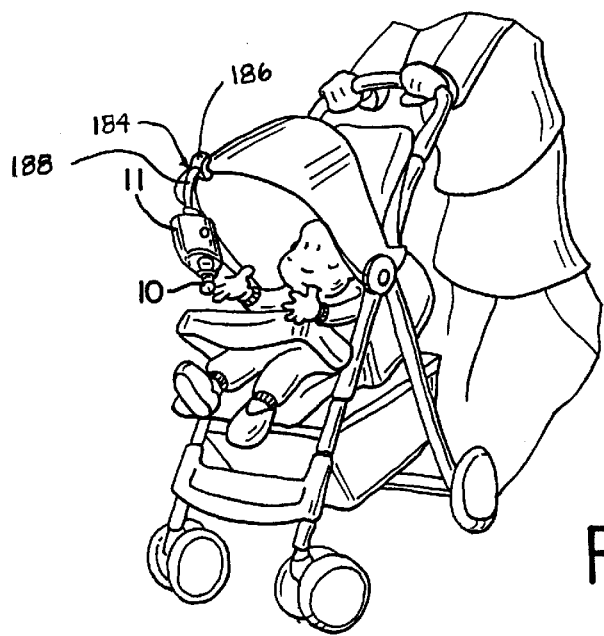
FIG. 32 is a schematic view showing another use of the vacuum demand flow valve of the present invention.
Figure 33A:
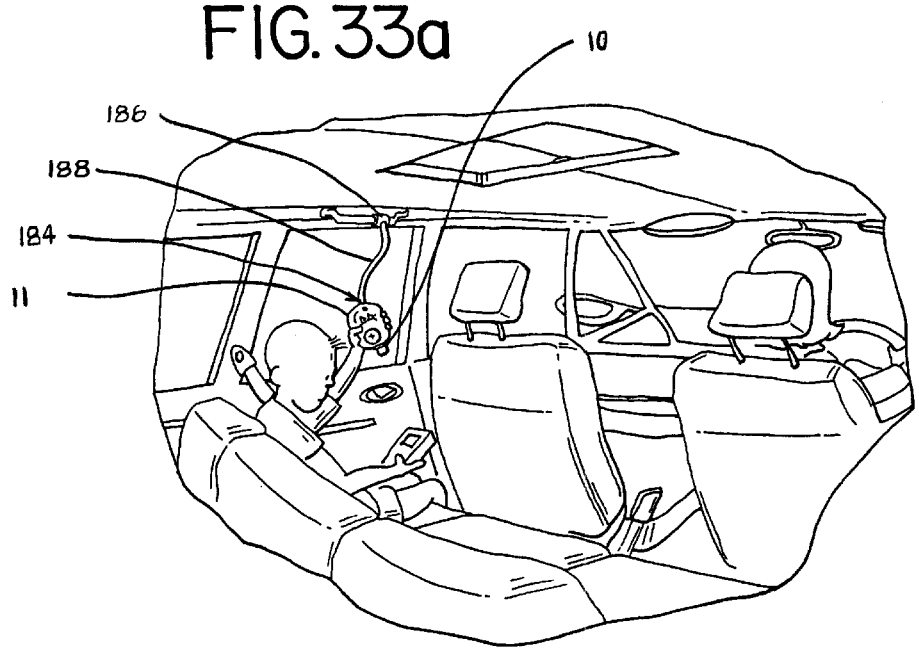
FIGS. 33a–b are schematic views showing additional uses of the vacuum demand flow valve of the present invention.
Figure 33B:
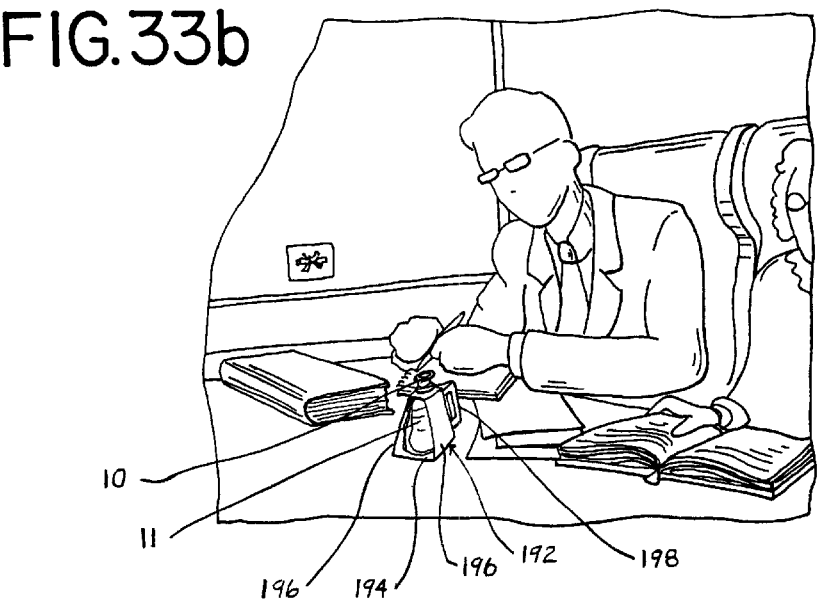
Figure 35:
FIG. 35 is a schematic view showing another use of the vacuum demand flow valve of the present invention.

Containers utilizing the flowable material delivery device/valve of the present invention have a broad variety of uses and applications. The valve 10 is ideal for using with hot or cold drinks, as well as non-carbonated drinks. Users can easily carry such a container 11 on their person (FIGS. 29 and 30). Containers 11 holding, for example, juice or milk, can also be used for children and infants (FIGS. 29 and 32). The containers 11 can also have a hanger member 184 associated therewith. As shown in FIGS. 32 and 33a, the hanger member 184 may include a clamp 186 and a band 188 connecting the clamp 186 to the container 11. The clamp 186 can be removably affixed to a support member. The support member can include a plurality of different types of members such as in a vehicle (FIG. 33a) or a stroller (FIG. 32) such as for an infant. The container 11 can then be hung from the support member to be grasped by a user. As shown in FIG. 34c, the clamp 186 can also be directly attached to the container 11. The containers 11 can also be utilized in a number of different recreational settings (FIGS. 31 and 35). The containers 11 are also ideal when taking part in active sporting activities (FIGS. 34a–d). As shown in FIGS. 34b and 34d, the container 11 could have a flexible tubing 190 attached thereto and a valve 10 attached to a distal end of the tube 190 wherein the tube 190 can be easily accessed hands-free such as when cycling or running. The container 11 can also be grasped with a single hand and the fluids consumed without further manual manipulation of the valve 10 (See FIG. 26). The containers 11 are further ideal to use when traveling (FIGS. 33a–b).

Figure 36A:
FIGS. 36a–b are schematic views showing additional uses of the vacuum demand flow valve of the present invention.
Figure 36B:
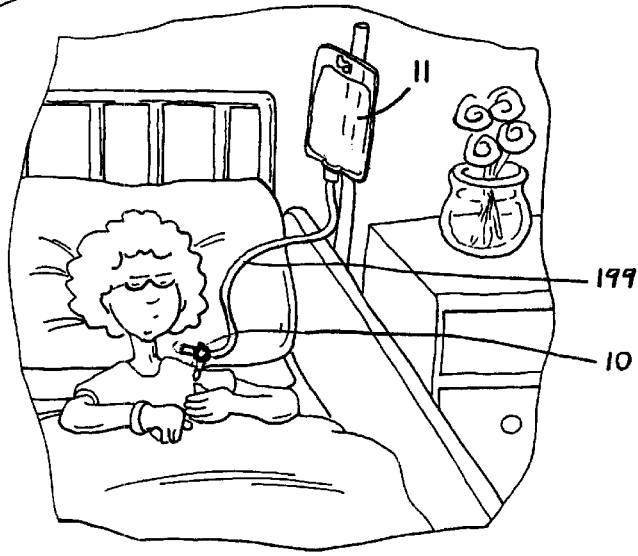

The container 11 can further be designed to stand upright in a predetermined position. As shown in FIG. 33b, the container 11 can also have a carrier 192 that can support the container 11 in a predetermined position. In one embodiment, the carrier 192 can have a base 194 and sidewalls 196. The carrier 192 may also have a handle 198. Finally, as shown in FIGS. 36a and 36b, the container 11 can be used by patients in a hospital setting. As further shown in FIG. 36b, an elongated tubing 199 can be attached to the container 11 with the valve 10 on the distal end of the tube. Uses also comprehended by the scope of the invention include storage and dispensing of industrial chemicals, medicaments or any other flowable material.

The valve 10 provides several benefits. The container 11 and valve 10 are low-cost and designed for single-use consumption wherein the container 11 and valve 10 can be discarded when the container 11 is empty. The valve 10, however, could also be used in multi-use applications. The valve 10 is suction-activated wherein the user can drink through the valve 10 as easily as with a conventional straw. The housing structure and valve function also prevent dripping from the valve. The structure of the valve 10 prevents fluid from being drawn back into the container once through the internal opening. The structure of the valve 10 also resists pressure from the container 11 and cannot be accidently activated. The valve 10 is not required to be recapped once opened as the valve 10 returns to its closed position upon non-use. The valve components are easily manufactured such as by an injection-molded process in one preferred embodiment. Because the valve can be constructed from certain injection-moldable materials, the valve can be operable through a broad range of temperatures and for extended periods of time.

It will be understood that the invention may be embodied in other specific forms without departing from the spirit or central characteristics thereof The present embodiments, therefore, are to be considered in all respects as illustrative and not restrictive, and the invention is not to be limited to the details given herein.

What is claimed is:

1. A valve comprising a member providing a first force operative to keep said valve closed in any orientation and a first pressure associated with said valve, said member being sensitive to an index pressure, and an outlet at a second pressure, said index pressure being distinct from said first pressure and said second pressure and providing a second force in opposition to said first force when a differential between said second pressure and said index pressure is provided to said member; and opening the valve when said second pressure is sufficiently less than the index pressure to overcome the first force and first pressure.

2. The valve of claim 1 and said member having a portion supplying said first force.

3. The valve of claim 1 wherein said valve closes under action of said second pressure when said index pressure provides said second force to said member of a magnitude less than that of said first force.

4. The valve of claim 2 wherein said valve closes under action of said second pressure when said second pressure on said member is substantially equal to said index pressure.

5. The valve of claim 1 and said member including a diaphragm.

6. The valve of claim 1 and said member including a stop.

7. The valve of claim 1 and said member including a plug.

8. The valve of claim 7 and said member being cooperative with an internal opening to selectively control the flow of a flowable material.

9. The valve of claim 1 and said index pressure being ambient.

10. The valve according to claim 1 and said valve being in communication with a fluid reservoir container adapted to deliver constant pressure.

11. A flowable material delivery device comprising a first chamber at a first pressure wherein said first chamber defines an outlet in communication with said first chamber, a second chamber at a second pressure at least substantially equal to said first pressure, and a valve member, indexed against a third pressure, and independently providing a bias cooperative with said second pressure; said valve member operating to selectively place said first chamber into communication with said second chamber independent of orientation when said first pressure is less than said third pressure.

12. The device of claim 11 wherein the valve member is biased to a closed position wherein the first chamber is not in communication with the second chamber.

13. The valve of claim 11 and said third pressure being ambient.

14. The valve according to claim 11 and said second chamber being in communication with a fluid reservoir container of constant pressure.

15. The container of claim 14 and a carrier for said container which is capable of supporting the container in a predetermined position.

16. The container of claim 14 further comprising a hanger member attached to the container, the hanger member adapted to be removably affixed to a support member.

17. A dispensing valve adapted to be connected to a container for dispensing a flowable material, the container having a first sidewall connected to a second sidewall at respective peripheral edges of the sidewalls to define a chamber therein holding the flowable material, the valve comprising:
a port tube defining an outer opening, the port tube adapted to be attached between the peripheral edges of the sidewalls;
a base member extending from a lower portion of the port tube, the base member having one end connected to an underside portion of the first sidewall at an intermediate location, the base member having an inner opening in communication with the chamber;
a flexible member extending from an upper portion of the port tube and connected to the first sidewall at the intermediate location;
a stop member connected to the flexible member and having a plug adapted to close the inner opening;
wherein when force is applied to the flexible member, the stop member is moved away from the inner opening allowing the flowable material to flow from the chamber, through the inner opening, and through the outer opening.

18. A container for dispensing a flowable material, the container comprising:
a sidewall defining a reservoir therein holding the flowable material;
a dispensing valve, the valve comprising:
a port tube defining an outer opening, the port tube adapted to be attached between the peripheral edges of the sidewalls;
a base member extending from a lower portion of the port tube, the base member having one end connected to an underside portion of the sidewall at an intermediate location, the base member having an inner opening in communication with the chamber;
a flexible member extending from an upper portion of the port tube and connected to the sidewall at the intermediate location;
a stop member connected to the flexible member and having a plug adapted to close the inner opening;
wherein when force is applied to the flexible member, the stop member is moved away from the inner opening allowing the flowable material to flow from the chamber, through the inner opening, and through the outer opening.

19. A valve comprising:
a housing defining a passageway between an outlet opening and an inner opening, and a member being deflectable from a first position to a second position associated with said housing; and
a stop connected to the deflectable member, wherein when the deflectable member is in the first position, the stop is in sealing contact with the inner opening to close the inner opening, and when the deflectable member is in the second position, the stop is spaced from the inner opening to open the inner opening,
wherein the valve is attached to a container having at least one flexible sidewall, wherein a portion of the flexible sidewall comprises the deflectable member.

20. A valve comprising:
a housing defining a passageway between an outlet opening and an inlet opening for a flowable material to pass therethrough, the housing having an internal wall dividing the passageway into a first chamber and a second chamber, the internal wall having an inner opening communicating the first chamber and the second chamber, the housing having an annular rim defining an aperture in communication with the first chamber, wherein the housing has a port member defining the outlet opening and a cap positioned over the port member and connected to the housing by a tamper evident strip;
a diaphragm connected to the annular rim; and
a stop connected to the diaphragm, the stop passing through the internal opening and having a flange in sealing contact with the inner opening;
the diaphragm being deflectable from a first position to a second position, wherein when the diaphragm is in the first position, the stop is in sealing contact with the inner opening to close inner opening, and when the diaphragm is in the second position, the stop is spaced from the second opening to open the inner opening wherein the flowable material is allowed to pass through the passageway.

21. A valve comprising:

a housing defining a passageway between an outlet opening and an inlet opening for a flowable material to pass therethrough, the housing having an internal wall dividing the passageway into a first chamber and a second chamber, the internal wall having an inner opening communicating the first chamber and the second chamber, the housing having an annular rim defining an aperture in communication with the first chamber, the housing further having a first vertical wall adjacent the annular rim defining a First groove and a second vertical wall adjacent the annular rim defining a second groove;

a diaphragm connected to the annular rim, a first portion of the diaphragm positioned in the first groove and a second portion of the diaphragm positioned in the second groove; and a stop connected to the diaphragm, the stop passing through the internal opening and having a flange in sealing contact with the inner opening;

the diaphragm being deflectable from a first position to a second position, wherein when the diaphragm is in the first position, the stop is in sealing contact with the inner opening to close inner opening, and when the diaphragm is in the second position, the stop is spaced from the second opening to open the inner opening wherein the flowable material is allowed to pass through the passageway.

22. A valve comprising:

a housing defining a passageway for a flowable material to pass therethrough, the housing having an internal wall dividing the passageway into a first chamber and a second chamber, the internal wall having an inner opening communicating the first chamber and the second chamber, the housing having an annular rim defining an aperture in communication with the first chamber;

a port member connected to the housing, the port member defining an outlet in communication with the passageway;

a collar positioned around the port member, the collar connected to the housing by a first flexible strap;

a diaphragm integrally connected to the port member, the diaphragm connected to the annular rim;

a diaphragm cover positioned over the diaphragm, the diaphragm cover connected to the collar by a second flexible strap; and a stop connected to the diaphragm, the stop passing through the internal opening and having a flange in sealing contact with the inner opening;

the diaphragm being deflectable from a first position to a second position, wherein when the diaphragm is in the first position, the stop is in sealing contact with the inner opening to close inner opening, and when the diaphragm is in the second position, the stop is spaced from the second opening to open the inner opening wherein the flowable material is allowed to pass through the passageway.

* * * * *

UNITED STATES PATENT AND TRADEMARK OFFICE
CERTIFICATE OF CORRECTION

PATENT NO. : 6,554,023 B2
DATED : April 29, 2003
INVENTOR(S) : Hal C. Danby, Mark E. Williamson and Julian F.R. Swan It is certified that error appears in the above-identified patent and that said Letters Patent is hereby corrected as shown below:

Title page,
Item [75], Inventors, please delete "Hal C. Danby, Sudbury (GB);
Mark E. Williamson, Wonder Lake, IL (US)" and insert therefore -- Hal C. Danby, Sudbury (GB); Mark E. Willamson, Wonder Lake, IL (US), Julian F.R. Swan, London (GB) --.

Item [56], References Cited, after FOREIGN PATENT DOCUMENTS, please delete insert another section, -- OTHER PUBLICATIONS
Valve produced by Source Vagabond Systems,. --.

Column 4,
Line 15, delete "FIG. 1," and insert therefore insert -- FIG. 11 --.

Column 7,
Line 50, delete "PI" and therefore insert -- P1 --.

Column 10,
Line 13, delete "FR(resultant force) AD (PI-P2)-AP(PC)-FB, and therefore insert,
-- FR (resultant force) = AD (PI-P2)-AP(PC)-FB --.

Column 15,
Line 52, delete "container II", and insert therefore -- container 11 --.

Column 19,
Line 15, delete "First", and insert therefore -- first --.

Signed and Sealed this

Seventh Day of October, 2003

JAMES E. ROGAN
*Director of the United States Patent and Trademark Office*